(12) United States Patent
Dixon et al.

(10) Patent No.: US 9,569,394 B2
(45) Date of Patent: *Feb. 14, 2017

(54) INTERCOMPONENT DATA COMMUNICATION

(71) Applicant: International Business Machines Corporation, Armonk, NY (US)

(72) Inventors: Robert C. Dixon, Austin, TX (US); Lonny J. Lambrecht, Byron, MN (US); Charles F. Marino, Round Rock, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/485,025

(22) Filed: Sep. 12, 2014

(65) Prior Publication Data

US 2015/0347343 A1 Dec. 3, 2015

Related U.S. Application Data

(63) Continuation of application No. 14/292,575, filed on May 30, 2014.

(51) Int. Cl.
*G06F 13/00* (2006.01)
*G06F 13/36* (2006.01)
(Continued)

(52) U.S. Cl.
CPC ......... *G06F 13/4068* (2013.01); *G06F 13/372* (2013.01); *G06F 13/4221* (2013.01); *G06F 13/4031* (2013.01)

(58) Field of Classification Search
CPC ............... H04L 49/254; H04L 12/5693; H04L 2012/5679; G06F 13/364; G06F 13/362; G06F 13/4031; G06F 13/1605; G06F 1/12; G06F 1/06; G06F 1/10; G06F 13/1689; G06F 1/08; G06F 2213/0038; G06F 5/06; G06F 13/4059
(Continued)

(56) References Cited

U.S. PATENT DOCUMENTS 4,633,394 A  12/1986 Georgiou et al.
4,730,268 A   3/1988 Marin
(Continued)

OTHER PUBLICATIONS

"U.S. Appl. No. 14/292,465 Office Action", Apr. 8, 2016, 7 pages.
(Continued)

*Primary Examiner* — Faisal M Zaman
(74) *Attorney, Agent, or Firm* — DeLizio Law, PLLC

(57) ABSTRACT

A request to send a first message from a first component to a second component is received at an arbiter. The first component is located in a first time zone and the second component is located in a second time zone. The arbiter determines that the second component is located in the second time zone. It is determined that the second time zone can be communicated with via one or more communications channels in a first direction. It is determined whether bandwidth is available on the one or more communications channels in the first direction. If bandwidth is available on the one or more communications channels in the first direction, a data path between the first component and the one or more communications channels in the first direction is created and the request is granted. Otherwise, the grant of the request is delayed.

7 Claims, 9 Drawing Sheets

(51) Int. Cl.
  *G06F 12/00* (2006.01)
  *G06F 13/14* (2006.01)
  *G06F 13/38* (2006.01)
  *G06F 13/362* (2006.01)
  *G06F 13/40* (2006.01)
  *G06F 13/372* (2006.01)
  *G06F 13/42* (2006.01)

(58) Field of Classification Search
  USPC ........ 710/107, 113, 240, 244, 114, 116, 242, 710/309, 241, 243, 311, 308; 713/400, 713/600, 500, 501, 503
  See application file for complete search history.

(56) References Cited

U.S. PATENT DOCUMENTS

| | | | |
|---|---|---|---|
| 4,794,516 A | | 12/1988 | Auerbach et al. |
| 5,168,568 A | | 12/1992 | Thayer et al. |
| 5,490,253 A | | 2/1996 | Laha et al. |
| 6,330,245 B1 | | 12/2001 | Brewer et al. |
| 6,647,439 B1 | | 11/2003 | Nouvet et al. |
| 7,249,210 B2 | | 7/2007 | Ganasan et al. |
| 7,366,810 B2 | | 4/2008 | Chang |
| 7,990,978 B1 * | 8/2011 | Chamas ................ H04L 47/525 370/395.21 |
| 8,001,504 B1 * | 8/2011 | Campbell ............ G06F 17/5031 716/106 |
| 8,356,128 B2 | | 1/2013 | Mittal |
| 9,143,122 B1 * | 9/2015 | Gaide .................... H03K 5/159 |
| 2002/0146022 A1 * | 10/2002 | Van Doren ........... H04L 49/506 370/412 |
| 2004/0028054 A1 * | 2/2004 | Khurana ............. H04L 12/4641 370/395.21 |
| 2005/0060456 A1 * | 3/2005 | Shrader ................ G06F 9/5016 710/240 |
| 2006/0041705 A1 | | 2/2006 | Bueti et al. |
| 2007/0263625 A1 * | 11/2007 | Engstrand ............. H04L 12/185 370/390 |
| 2008/0162745 A1 | | 7/2008 | Tkacik et al. |
| 2008/0209093 A1 * | 8/2008 | Huang .................. G06F 13/362 710/107 |
| 2011/0179248 A1 * | 7/2011 | Lee ........................ G06F 13/364 711/171 |
| 2012/0072631 A1 | | 3/2012 | Chirca et al. |
| 2013/0054856 A1 * | 2/2013 | Lim ........................ G06F 13/14 710/242 |
| 2013/0297806 A1 * | 11/2013 | Catangiu ................. G06F 9/505 709/227 |
| 2015/0347333 A1 | | 12/2015 | Dixon et al. |
| 2015/0347334 A1 | | 12/2015 | Dixon et al. |
| 2015/0347340 A1 | | 12/2015 | Dixon et al. |

OTHER PUBLICATIONS

Co-pending U.S. Appl. No. 14/292,465, filed May 30, 2014, 83 pages.
Co-pending U.S. Appl. No. 14/292,575, filed May 30, 2014, 83 pages.
Bajaj, et al., "Arbitration Schemes for Multiprocessor Shared Bus", New Trends and Developments in Automotive System Engineering; Hard cover, 664 pages, Jan. 2011, pp. 395-410.
Clark, et al., "Cell Broadband Engine Interconnect and Memory Interface", IBM, Systems and Technology Group manual, 2005, pp. 1-22.
Kallakuri, et al., "Customization of Arbitration Policies and Buffer Space Distribution using Continuous Time Markov Decision Processes", Very Large Scale Integration (VLSI) Systems, IEEE Transactions on(vol. 15 , Issue: 2), Feb. 2007, pp. 1-5.
"U.S. Appl. No. 14/292,575 Office Action", Jun. 17, 2016, 7 pages.

\* cited by examiner

INTERCOMPONENT DATA COMMUNICATION

RELATED APPLICATIONS

This application is a Continuation of and claims the priority benefit of U.S. patent application Ser. No. 14/292,575 filed May 30, 2014.

BACKGROUND

Embodiments of the inventive subject matter generally relate to the field of computing systems, and, more particularly, to data communication between computing system components.

A large percentage of today's computing systems include multiple processors. In fact, even many cellphones include processors with multiple cores, which frequently function similarly to multiple processors. Larger, enterprise computing systems can include multiple nodes, such as blade servers, each of which includes multiple multi-core processors. Computing tasks can be divided among the various nodes, processors, and cores of a system. Often, when computing tasks are divided among computing system components, data is communicated between the various sub-tasks. Further, various components within a processor communicate as well. As the communication traffic increases and computing systems become more complex, coordinating use of the limited resources becomes more complex as well.

SUMMARY

Embodiments of the inventive subject matter generally include a method that includes receiving, at an arbiter, a request to send a first message from a first component of a first plurality of components to a first component of a second plurality of component. The first plurality of components is in a first time zone, which represents a first area of a processor in which processor signals can traverse within a specified amount of time. The second plurality of components is in a second time zone, which represents a second area of the processor in which processor signals can traverse within the specified amount of time. A processor signal sent from the first component of the first plurality of components to the first component of the second plurality of components is not received within the specified amount of time. The method also includes determining, by the arbiter, that the first component of the second plurality of components is located in the second time zone. The method also includes, in response to determining that the first component of the second plurality of components is located in the second time zone, determining that the second time zone can be communicated with via one or more communications channels in a first direction. The method also includes, in response to determining that the second time zone can be communicated with via the one or more communications channels in the first direction, determining whether bandwidth is available on the one or more communications channels in the first direction. The method also includes, in response to determining that bandwidth is available on the one or more communications channels in the first direction, creating a data path between the first component of the first plurality of components and the one or more communications channels in the first direction and granting the request to send the first message to the first component of the second plurality of components. The method also includes, in response to determining that bandwidth is not available on the one or more communications channels in the first direction, delaying the grant of the request to send the first message to the first component of the second plurality of components.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
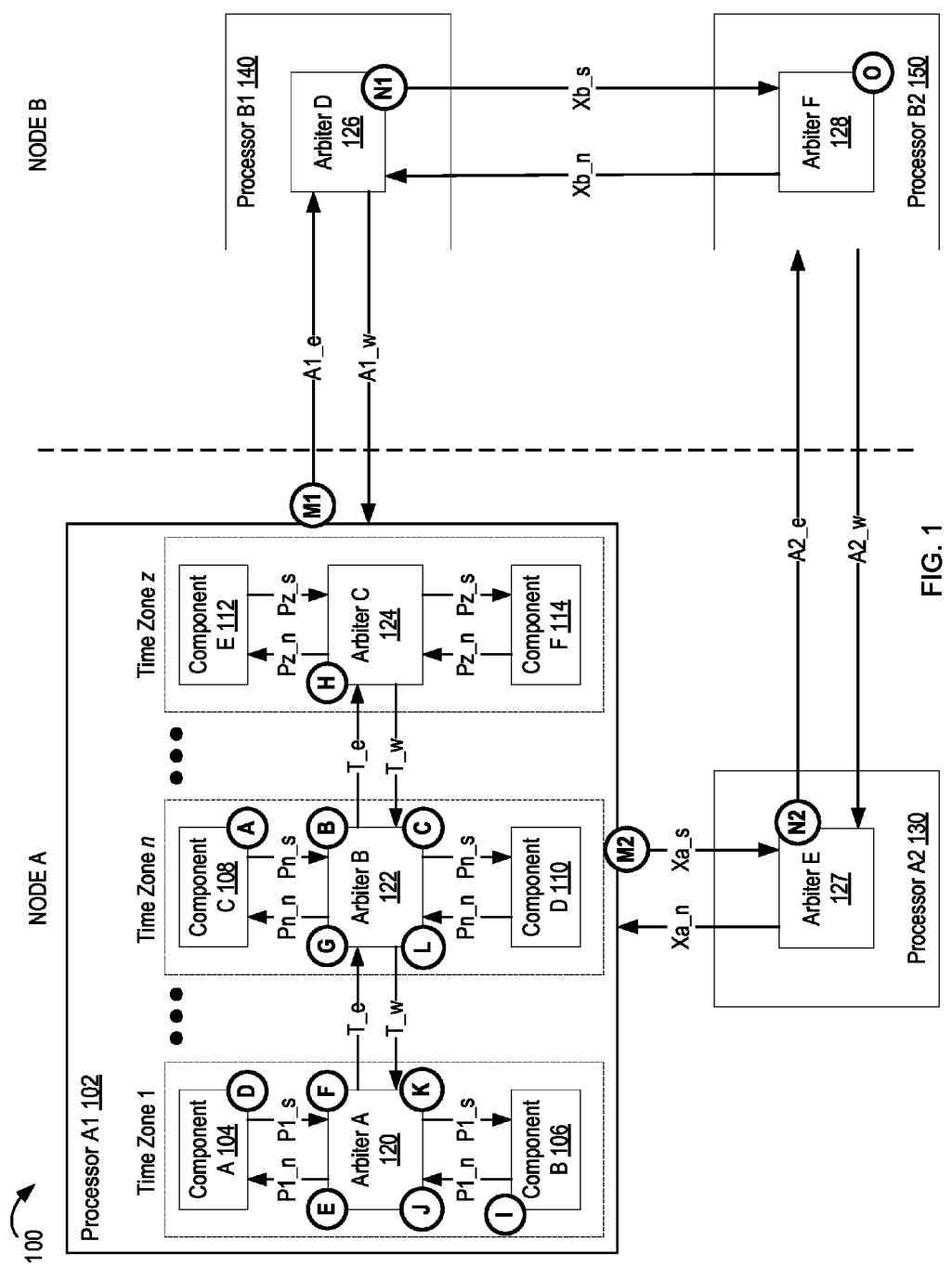
FIG. 1 depicts the operations of an arbitrated processor communication infrastructure for intra-processor and inter-processor communications.

The description that follows includes example systems, methods, techniques, instruction sequences and computer program products that embody techniques of the present inventive subject matter. However, it is understood that the described embodiments may be practiced without these specific details. For instance, although examples refer to latches, other storage mechanisms can be used, such as flip flops and registers. In other instances, well-known instruction instances, protocols, structures and techniques have not been shown in detail in order not to obfuscate the description.

Communications between computing system components can be broken down into two categories, intra-processor communications and inter-processor communications. Intra-processor communications comprise communications between components located on the same processor. For example, two cores might exchange messages and/or communicate with a memory module. Inter-processor communications comprise communications between components located on one processor and components located on other processors. For example, a computing process might be divided into two sub-processes and assigned to two different processors. The sub-processes might communicate in order to synchronize their operation.

The inter-processor communications become more complex as the computing systems become more complex. Computing systems can be divided into nodes, such as a set of blade servers within a server rack working in conjunction with each other. Similarly, an enterprise computing system can comprise a large cabinet that includes multiple motherboard-like nodes. Further, nodes can be coupled with each other to work in conjunction as well (thus resulting in hierarchical or nested node configurations). Regardless of the specific configuration, a processor on one node might need to communicate with a processor on another node.

For the purposes of the discussion herein, a node can be any logical division of computing components that can include a processor (i.e., neither a processor itself nor a portion of a processor are a node). Typically, a node comprises one or more processors located on a single board and coupled together with a high-speed bus (relative to a bus coupling nodes together). However, as described above, a node can comprise other nodes and is not limited to a single board.

While the techniques for intra-processor communications and inter-processor communications can vary greatly, they can be implemented with each other in mind. Consider, for example, the fact that a communication (hereinafter "message") generally originates at a component within the processor and uses the intra-processor communications infrastructure to reach a point at which it can be transferred to the inter-processor communications infrastructure. The design of the intra-processor communications infrastructure can thus make provisions for carrying inter-processor messages. Further, maximum (or available) bandwidth might vary between the intra-processor communications infrastructure and the inter-processor communications infrastructure. For example, if the inter-processor communications infrastructure has lower bandwidth than the intra-processor communications infrastructure, there is a risk that the inter-processor communications infrastructure might be overwhelmed by the volume of messages that are capable of being sent over the intra-processor communications infrastructure. Thus, while it can be useful to discuss the implementations of an intra-processor communications infrastructure and inter-processor communications infrastructure separately, they are linked together to form a single communications infrastructure to service the computing system.

Due to the complex interactions of the various features of the communications infrastructures, the discussion below begins with a high level overview of at least some of the features. Thus, in order to provide a more succinct explanation of the features themselves, the high level overview of the features precedes the actual description of the interactions between the various components of the communications infrastructure.

Intra-Processor Communications

The size of a processor can be large enough that electrical signals cannot travel from one part of the processor to another in one clock cycle. Thus, when designing the communications infrastructure within the processor, the distance between various locations on the processor are taken into account. Because many hardware components function based on synchronization with clock signals, techniques are used to ensure that data is available at the correct time. Further, the communications infrastructure consists of finite resources. An appropriate analogy, if perhaps cliché, is a city's transportation infrastructure. The available infrastructure may support a limited number of vehicles, resulting in traffic jams when the number of vehicles increases past a particular threshold. Similarly, components within computing systems are implemented to control access to the limited, shared resources available for communicating messages.

One technique that is useful for compensating for processor size is to divide the processor components into "time zones". The time zones are divided up such that messages can travel between the components of the time zone within a single clock cycle. For example, if it takes four clock cycles for a message to travel from one physical corner of a processor to the corner farthest away, the processor might be divided into four time zones. The specific boundaries used to define a time zone can also incorporate other factors, including specific functions of the various components and physical design considerations. For example, even though some components might be physically located next to each other, the design of the processor might be such that it is not feasible to physically connect them. Some aspects of selecting the boundary of the time zones might be arbitrary as well. For example, if a first component and second components are within one clock cycle of a third component, but the first component and second component are two clock cycles apart, the third component could belong to a time zone with either the first component or second component, but not both.

Each time zone includes an arbiter that functions as the "gatekeeper" to the finite resources used for the communications infrastructure. In other words, the arbiter determines whether a particular component is allowed to access the limited resources available for communicating data. The arbiter can comprise multiple arbiters that perform specific functions.

Arbiters in different time zones are linearly interconnected using a communications trunk (hereinafter "trunk"). In other words, a trunk runs from a first arbiter to a second arbiter, from the second arbiter to a third arbiter, etc. The trunk begins at one arbiter and ends at another arbiter. The number of arbiters between the terminal arbiters can vary between implementations.

The trunk allows messages to be sent in either direction and can be analogized to a highway that runs through various cities. As with a highway, the trunk can allow messages to travel in two directions (e.g., from east to west and west to east). The trunk includes individual portions that sequentially connect one time zone with the next time zone via the associated arbiters. Each portion of the trunk includes two sets of communication channels (analogous to highway lanes). One set of communication channels carries data in one direction (e.g., east), while the other set of communication channels carries data in the other direct (e.g., west). Each communication channel (hereinafter "channel") includes individual lines that carry single bits. Each channel includes enough lines to carry at least one message. In other words, if a message is sixteen bits wide, each channel includes sixteen lines. The trunk configuration can vary based on the method width, practical design and implementation constraints, time zone arrangement, etc. The discussions herein will describe the trunk as being linear, with east and west directions, and with the bits associated with an individual message travelling in parallel. However, the arbiters and other hardware can be implemented to handle message data transmitted in serial.

Arbiters receive, and give priority to, messages coming along the trunk. For example, if a message comes into an arbiter along a trunk having a single channel, destined for the next time zone, the arbiter allows the trunk message to pass through at the expense of any local requests (i.e., requests from within the same time zone as the arbiter). By giving priority to the messages coming from other time zones, the amount of coordination between arbiters is reduced, as any arbiter can send a message any time there is available trunk bandwidth without consideration for downstream arbiters. In other words, the arbiters do not communicate with each other to determine whether others have messages to send.

Such implementations can result in upstream arbiters using all of the available bandwidth, causing the downstream arbiters to "starve". The specific trunk implementation can take into account expected traffic levels, thus including enough bandwidth to prevent arbiter starvation most of the time. However, because the number of messages can vary, arbiter starvation is still a possibility. To allow downstream arbiters to send a message when the trunk bandwidth is being used by upstream arbiters, an arbiter can request a "fixed reservation". The arbiter sends an indication to the arbiter (or other component) at the head (upstream end) of the trunk. The arbiter at the head of the trunk creates a "bubble" on the trunk that is reserved for the requesting arbiter. All arbiters allow the bubble to pass through until it reaches the requesting arbiter. Once the requesting arbiter receives the bubble, the requesting arbiter sends a message in place of the bubble. In other words, a fixed reservation allows a requesting arbiter to request bandwidth for sending a message.

Arbiters also receive requests to send messages using the communications infrastructure from components that are located in the same time zone as the respective arbiters. The messages can be destined for another component within the same time zone or a component within another time zone. For messages destined for another component within the same time zone, the arbiter determines whether the destination component has sufficient input bandwidth to receive the message. For example, because messages received along the trunk receive priority, all inputs to the destination component might be used by messages received from other time zones. For messages destined for a component within a different time zone, the arbiter determines whether there is sufficient bandwidth available on the trunk.

Consider a practical example. Each component within a time zone will typically have limited bandwidth for receiving messages. In other words, a processor core might only be able to receive two messages during a clock cycle. If, during a particular clock cycle, the processor core is receiving data from a different time zone and two components within the same time zone as the processor core request to send a message to the processor core, only one of the requests can be granted. Because the message from the different time zone receives priority, it uses one of the two available message inputs. Thus, with the two components within the same time zone competing for one available message input, the arbiter can only grant one request.

The arbiter is responsible for routing messages to particular locations. For example, if a message is to be passed along the trunk, the arbiter routes the message to the continuation of the trunk that leaves the arbiter. If a message destination is a component within the same time zone as the arbiter, the message is routed from the trunk to an input of the destination component. To continue the transportation infrastructure analogy, each arbiter includes one or more "off ramps" for the data to exit the "highway" (trunk) at the appropriate "city" (time zone).

Inter-Processor Communications

Processors are coupled together similar to arbiters. A trunk that couples processors on the same node is referred to as an "inter-processor link" and a trunk that couples processors on a different node is referred to as an "inter-node link". Collectively, inter-processor links and inter-node links are referred to as "external links". Inter-node links couple corresponding processors on different nodes. For example, a first processor on a first node is coupled with a first processor on a second node, a second processor on the first node is coupled with a second processor on the second node, etc. Implementations can vary, however, and nodes can have different numbers of processors.

The external links interconnect with a processor trunk at an arbiter (external link arbiter). The particular arbiter can vary, and different external links can interconnect with the processor trunk at different arbiters. The descriptions herein assume that all external links are associated with a single arbiter located in a central time zone (i.e., located centrally along the trunk). A component in one processor can send a message to a component in any processor on any node. The message is routed via one of the multiple paths to the appropriate processor. Each external link arbiter along the path routes the message along another external link. The external link arbiter at the destination processor then routes the message to the destination time zone. The arbiter at the destination time zone then routes the message to the destination component.

The external links have finite bandwidth, similar to the trunk. However, unlike the trunk, only the external link arbiter is coupled with the external links. Thus, the arbiters cannot determine the amount of bandwidth available on the external links by determining the number of messages that will be sent out via the external links. To control access to the external links, tokens are circulated among the arbiters within a processor. Each token corresponds to bandwidth on an external link and each external link can have independent sets of tokens. When a component requests to send a message to a component in a different processor, an arbiter obtains a token for one of the external links. Once a token is obtained, the arbiter waits until bandwidth along the trunk is available and grants the request. The token is sent along with the message, and once the message is sent, the token is put back into circulation. Because no more messages can be sent than there are tokens and the tokens correspond to the bandwidth available on the external links, the external links cannot be overwhelmed by the arbiters granting a large number of requests at the same time.

Example Illustrations of a Processor Communication Infrastructure Using Arbiters FIG. 1 depicts the operations of an arbitrated processor communication infrastructure for intra-processor and inter-processor communications. FIG. 1 depicts a computing system 100 comprising two nodes, node A and node B. Node A comprises processor A1 102 and processor A2 130 and node B comprises processor B1 140 and processor B2 150. Processor A1 102 comprises z time zones, of which time zone 1, time zone n, and time zone z are depicted. The other processors, processor A2 130, processor B1 140, and processor B2 150, can be configured similarly to processor A1 102, or can vary. The example illustrations discussed herein will assume that processor A2 130, processor B1 140, and processor B2 150 are configured similarly.

Time zones 1, n, and z of processor A1 102 each comprise an arbiter (arbiter A 120, arbiter B 122, and arbiter C 124, respectively) and two components (component A 104, component B 106, component C 108, component D 110, component E 112, and component F 114, respectively). Each time zone includes links from the components to the time zone arbiter. For example, time zone 1 includes link P1_$n$ and link P1_$s$. Link P1_$n$ carries messages north from component B 106 to arbiter A 120 and from arbiter A 120 to component A 104. Similarly, link P1_$s$ carries messages south from component A 104 to arbiter A 120 and from arbiter A 120 to component B 106. Processor A1 102 also includes a trunk for communicating among time zones, indicated by T_e and T_w, for eastern and western message directions, respectively.

Processor A2 130, processor B1 140, and processor B2 150 include arbiters 126, 127, and 128, respectively. Arbiters 126, 127, and 128 are functionally equivalent to arbiter B 122 for the purposes of the example illustrations discussed herein.

Messages flow from processor A1 102 to processor A2 130 over link Xa_s. Messages flow from processor A2 130 to processor A1 102 over link Xa_n. Similarly, messages flow from processor B1 140 to processor B2 150 over link Xb_s. Messages flow from processor B2 150 to processor B1 140 over link Xb_n. Further, messages flow from processor A1 102 to processor B1 140 over link A1_e. Messages flow from processor B1 140 to processor A1 102 over link A1_w. Similarly, messages flow from processor A2 130 to processor B2 150 over link A2_e. Messages flow from processor B2 150 to processor A2 130 over link A2_w. Although not depicted, each link, including the trunk, can include multiple channels.

Each node, processor, time zone, and component has an associated identifier. The identifiers are accessible or determinable by the components of the computing system 100. A combination of the identifiers can be used to identify the various components as well. For example, component C 108 can be identified with a combination of the identifiers for node A, processor A1 102, and time zone n in conjunction with the identifier for component C 108. The identifiers allow for specific destinations to be identified and can be used to route messages. In some implementations, the individual identifiers are determined by querying a routing table or similar structure based on a component identifier. The example illustrations assume that identifiers for the nodes, processors, time zones, arbiters, and components of the computing system 100 can be determined based, at least in part, on the identifier of a component. Messages are associated with metadata that indicates the identifier of a destination component.

Stages A-C depict example operations for communications between time zones within the same processor ("intra-time zone communications"). At stage A, component C 108 sends, to arbiter B 122, a request to send a message to component D 110. The request is pushed onto a circular queue maintained by arbiter B 122. The request indicates the identifier of the requesting component (component C 108) and the identifier of the destination component (component D 110). The use of a circular queue provides a convenient mechanism for maintaining the order in which requests are received while also allowing unserviceable requests to be pushed back onto the queue. Alternative data structures, such as a priority queue or linked list, can be used by arbiter B 122 to store requests as well. Additionally, in some implementations, a request is indicated using a request line and the destination component identifier is stored in a storage location accessible to arbiter B 122. Arbiter B 122 can maintain a counter for each component to determine how long a particular request has been pending.

At stage B, arbiter B 122 determines whether to grant the request received from component C 108. Arbiter B 122 first determines, based on the destination component identifier specified with the request, that the destination component is component D 110. In particular, arbiter B 122 determines that component D 110 is in the same time zone as arbiter B 122 by comparing the node identifier, processor identifier, and time zone identifier indicated by the destination component identifier. If the node identifier, processor identifier, and time zone identifier indicated by the destination component identifier is the same as the node identifier, processor identifier, and time zone identifier associated with arbiter B 122, the destination component is in the same time zone.

After determining that the destination component is within the same time zone, arbiter B 122 determines the number of messages component D 110 can receive during a given clock cycle. The number of messages a particular component can receive during a given clock cycle can be a static number across all components or can vary between components. The number of messages a particular component can receive can be stored in a register accessible to the arbiter or other memory location. Arbiter B 122 also determines the number of messages that are arriving on the trunk during the next clock cycle that are destined for component D 110. To do so, arbiter B 122 looks at the destination for each message that will arrive on T_e or T_w. Arbiter B 122 also determines the number of messages from other components (not depicted) of time zone n that are destined for component D 110 that have had their associated request granted. If the total number of messages that indicate component D 110 as the destination is equal to or greater than the total number of messages component D 110 can receive during a given clock cycle, the request is not granted. If the total number of messages that indicate component D 110 as the destination is less than the total number of messages component D 110 can receive during a given clock cycle, the request is granted.

In some instances, component D 110 might be receiving a large number of messages from other time zones over multiple clock cycles. Because messages from other time zones receive priority over intra-time zone communications, such a scenario can result in the request from component C 108 not being granted for a number of clock cycles. If the number of clock cycles in which the request is not serviced reaches a particular threshold, arbiter B 122 can send a request for a fixed reservation to an arbiter in one of the terminal time zones. Arbiter B 122 determines when the fixed reservation bubble is about to arrive at time zone n and grants the request from component C 108. The bubble effectively guarantees available bandwidth to arbiter B 122, preventing the request from component C 108 from blocking for a length longer than the particular threshold plus the length of time taken for the bubble to reach the requesting arbiter.

Component D 100 might have multiple inputs. In some implementations, the inputs might be fixed, such that all intra-time zone messages flow to a particular set of one or more inputs and all messages from other time zones flow to a different set of one or more inputs. However, in some implementations, the inputs might not be fixed, thus allowing the inputs to be used for messages coming from any location. In such implementations, arbiter B 122 can determine which input the message from component C 108 flows to.

If arbiter B 122 determines that the request should be granted, arbiter B 122 performs any operation(s) to allow the message from component C 108 to flow to component D 110. For example, link Pn_s can be an input to a multiplexer (not depicted). The multiplexer can have an output to an input of component D 110. Arbiter B 122 selects the input of the multiplexer corresponding to the output from component C 108, thus resulting in any message sent by component C 108 to the input of the multiplexer passing through to component D 110. The operations can take into account the particular input to component D 110 determined, if relevant to the particular implementation.

If the request is not granted, arbiter B 122 does not explicitly deny the request. Thus, the request from component C 108 persists until granted. At the beginning of each arbitration period, arbiter B 122 pops the first request off the head of the queue and determines if there is bandwidth available for that request. If so, the request is granted and the next request is popped off the head of the queue. The process continues until all requests are serviced or have been iterated over. As another example, also described above, the component C 108 might indicate a request to arbiter B 122 by putting a high voltage on a line (e.g., wire) coupling the component C 108 and arbiter B 122. While the voltage on the request line is high, a counter increments on each cycle. When arbiter B 122 grants the request from the component C 108, arbiter B 122 resets the counter. Thus, at the beginning of each arbitration period, arbiter B 122 determines whether bandwidth is available for the request that is associated with the highest counter. If bandwidth is available, arbiter B 122 grants the request. Arbiter B 122 then performs the same operations for the request with the next highest counter, etc.

At stage C, the message is sent from component C 108 to component D 110 and arbiter B 122 indicates that the request was granted. In some implementations, the message is sent once the operations to route the message are completed at stage B. In other words, the message can be sent without any further operation being performed by arbiter B 122 or component C 108. Consider an implementation in which the message is stored in a latch in component C 108 and flows into an input latch in component D 110. While stored in component C's latch, the latch outputs a signal representing the message. Once the output from the latch is routed to the input latch of component D 110, the message output immediately flows through to the input latch of component D 110. In some implementations, however, component C 108 does not actually send the message until it receives an indication that the request is granted. In other words, component C 108 waits for an explicit indication that the request was granted before outputting the message.

Arbiter B 122 can indicate to component C 108 that the request was granted by sending a signal to component C 108. For example, arbiter B 122 might indicate that the request was granted by setting a particular input of component C 108 to a high voltage. After receiving the indication that the request was granted, component C 108 can send the message (if not done automatically) and perform any other operations, such as initializing the storage location in which the message was stored, replacing the message with other data, notifying a process that the message was sent, etc.

Stages D-H depict example operations for communications between time zones within the same processor ("inter-time zone communications"). In particular, stages D-H depict a message being sent from component A 104 in time zone 1 to component F 114 in time zone z.

At stage D, component A 104 sends, to arbiter A 120, a request to send a message to component F 114. The operation(s) performed at stage D can be substantially similar to those described above at stage A. In particular, it is assumed that the request is pushed onto a circular queue maintained by arbiter A 120.

At stage E, arbiter A 120 determines whether to grant the request from component A 104. Arbiter A 120 first determines that the destination component is located in a different time zone by comparing the node identifier, processor identifier, and time zone identifier indicated by the destination component identifier with the node identifier, processor identifier, and time zone identifier associated with arbiter A 120. If the node identifier and processor identifier indicated by the destination component identifier is the same as the node identifier and processor identifier associated with arbiter A 120, while the time zone identifiers differ, the destination component is on the same processor but in a different time zone.

After determining that the destination component is in a different time zone, arbiter A 120 determines in which direction along the trunk the destination component lies. In this particular example, component A 104 is located in time zone 1, which is the westernmost time zone (i.e., a terminal time zone). As such, the only direction inter-time zone messages can travel are to the east along T_e. Thus, arbiter A 120 need not actually determine a direction. However, if the message originated in a non-terminal time zone (such as time zone n), the particular arbiter for the originating time zone determines the direction along the trunk that the message will travel. The determination of the direction the message will travel can vary depending between implementations. For example, if the time zones are identified by sequential identifiers corresponding to their location along the trunk, the originating arbiter can compare the destination time zone identifier with the identifier associated with the originating arbiter. If the destination time zone identifier is less than the originating arbiter time zone identifier, the message is to be sent in a corresponding trunk direction (e.g., west). If the destination time zone identifier is greater than the originating arbiter time zone identifier, the message is to be sent in the other trunk direction (e.g., east).

If the implementation is such that the originating arbiter cannot determine the direction based on identifier comparisons or other computations, the originating arbiter can utilize a routing table or similar data structure. For example, the routing table can indicate routes to particular nodes, processors, time zones, or components. The originating arbiter queries the routing table using the destination component identifier (or subset thereof) to determine the route to the destination time zone, including the direction along the trunk.

After determining the direction of message travel (if relevant), arbiter A 120 determines whether bandwidth exists on the trunk in the determined direction of travel. The total bandwidth available is the number of channels available in the determined direction. Arbiter A 120 can take into account messages that are passing through the current time zone and any fixed reservations for other time zones. The specific determination can vary between arbiters in terminal time zones and arbiters in non-terminal time zones.

For example, if in a terminal time zone, as in this example, the originating arbiter does not have messages coming in on the trunk. Arbiter A 120 thus determines whether bandwidth exists to grant the request by determining the number of components in time zone 1 with granted requests to use T_e and determining the number of fixed reservation requests pending. As described above, a fixed reservation is a request by an arbiter along the trunk for a "bubble" in the trunk traffic that is reserved for use by the requesting arbiter. Arbiter A 120 allows a bubble to travel along the trunk, which reduces the bandwidth available to arbiter A 120. Thus, arbiter A 120 subtracts the number of pending fixed reservation requests from the total number of channels available on T_e. Arbiter A 120 also determines the number of components within the time zone that have granted requests to use T_e. The number of components within the time zone that have granted requests to use T_e is subtracted from the total bandwidth minus the number of pending fixed reservations. If the result is greater than or equal to zero, arbiter A 120 can grant the request from component A 104.

If the result is less than zero, there is insufficient bandwidth to service all requests for T_e.

When there is insufficient bandwidth to handle all requests from components within time zone 1, arbiter A 120 can determine which components get access to T_e using mechanisms such as those described above. For example, arbiter A 120 can determine priority based on the length that the requests from components have been pending using a counter or based on the location of the requests in the circular queue. For example, if three channels on T_e are available, and component A 104 has one of the top three priorities for components within time zone 1, the request from component A 104 is granted.

If not in a terminal time zone, an originating arbiter determines the bandwidth available on the trunk in the direction the message is to be sent based on the incoming messages along the trunk. Assume, for example, that time zone 1 is not a terminal time zone and the message to be sent by component A 104 is to travel along T_e to time zone z and component F 114. Arbiter A 120 determines the bandwidth available by determining the number of channels along T_e that are available for use by arbiter A 120. The number of channels along T_e that are available for use by arbiter A 120 are: channels that are not being used to transmit a message; channels that have messages destined for time zone 1; and channels that have a bubble associated with time zone 1. If the total number of channels that are available for use by arbiter A 120 is greater than or equal to the number of components requesting use of T_e, all requests, including the request from component A 104, are granted. If the total number of channels that are available for use by arbiter A 120 is less than the number of components requesting use of T_e, the requests are granted based on priority, as described above. In other words, if two channels are available and component A 104 has the third highest priority, the request from component A 104 is not granted.

If the request from component A 104 is granted, arbiter A 120 performs any operation(s) that allow the message to flow from component A 104 onto T_e. For example, the output from component A 104 can serve as an input into a multiplexer associated with an available channel along T_e. Arbiter A 120 then selects the input of the multiplexer that is associated with the output from component A 104, allowing the message from component A 104 to flow onto the available channel.

At stage F, the message flows to arbiter B 122 via T_e and arbiter A 120 indicates to component A 104 that the request was granted. Arbiter A 120 indicates to component A 104 that the request was granted, as described above at stage C. Also similar to the operations described above at stage C, the message can be transmitted as soon as the operations are performed to route the message from component A 104 to T_e.

As described above, the establishment of the time zones 1 through z allows the communications infrastructure to compensate for distances that might take the message multiple clock cycles to travel over. In other words, the distance along T_e between arbiter A 120 and arbiter B 122 might take at least two clock cycles for the message to traverse. Further, allowing message metadata to arrive before the message itself allows the arbiter B 122 to make arbitration decisions before the message itself arrives.

To facilitate the arrival of the message at the proper time, the message is temporarily stored in one or more latches (or other storage mechanism) along T_e. For example, the message flows to, and is stored in, a first latch (not depicted) from component A 104 during a first clock cycle. During a second clock cycle, the message flows from the first latch to, and is stored in, a second latch (not depicted). The message arrives at arbiter B 122 at a third clock cycle. The message metadata flows along a separate channel than the message itself. The channel for the message metadata only includes a single latch, as opposed to two. Thus, the message metadata reaches arbiter B 122 during the second clock cycle, while the message itself reaches arbiter B 122 during the third period.

At stage G, arbiter B 122 receives the message metadata and performs arbitration operations based on the message metadata, allowing the message to pass through arbiter B 122. Arbiter B 122 reads the destination component identifier from the message metadata to determine whether the destination component is in the time zone associated with arbiter B 122 (time zone n) or a time zone further along T_e. Similar to the operations described above at stage B, arbiter B 122 compares the destination node identifier, processor identifier, and time zone identifier with the node identifier, processor identifier, and time zone identifier associated with arbiter B 122. If the destination node identifier and processor identifier are the same as the arbiter's node identifier and processor identifier, but the time zone identifiers differ, the destination component is in a different time zone further along T_e.

In this particular example, the destination component is component F 114, which is located in time zone z. Thus, arbiter B 122 determines that the destination component is a time zone further along T_e. Arbiter B 122 can utilize this determination when performing arbitration operations for communication requests originating from within time zone n (such as those described at stages A-C). For example, because arbiter B 122 allows the message to pass through time zone n along T_e, the message occupies some of the bandwidth of T_e between time zone n and time zone z. Thus, the message reduces the amount of bandwidth available for messages originating from within time zone n that are destined for time zones to the east of time zone n. The message, however, does not occupy an input slot for any of the components located in time zone n.

Once the destination time zone is determined, arbiter B 122 performs any operation(s) that allow the message to flow through time zone n along T_e. The mechanism to allow messages to pass through a time zone along a trunk channel can be similar to those described above for allowing a message to flow from a component within a time zone along a trunk. For example, the channel of T_e on which the message is to be sent can serve as an input into a multiplexer. The output of the multiplexer is coupled to the corresponding channel along the continuation of T_e. Arbiter B 122 selects the input corresponding to the continuation of T_e, allowing the message to flow through along T_e. Arbiter B 122 can perform similar operations for the message metadata.

The portion of T_e between time zone n and time zone z can be configured similarly to the portion of T_e between time zone 1 and time zone n. As described above, there can be a set of one or more latches along T_e to temporarily store the message, and one or more latches to temporarily store the message metadata. Similarly, the message can flow through arbiter B 122 to a first of the latches immediately upon arbiter B 122 performing the operations to allow the message to flow through time zone n (e.g., during the same clock cycle). In some implementations, the message can also flow through arbiter B 122 at a point after arbiter B 122 performs the operations to allow the message to flow through time zone n.

At stage H, arbiter C 124 receives the message metadata and performs arbitration operations based on the message metadata, allowing the message to flow to component F 114. Similar to the operation described above at stage G, arbiter C 124 determines the destination component based on the message metadata. Arbiter C 124 determines that the destination is within time zone z and determines that the destination is component F 114. Arbiter C 124 then performs operations to allow the message to flow to component F 114. For example, a multiplexer can couple the channel of T_e that is used to send the message to an input of component F 114. Arbiter C 124 selects the input of the multiplexer associated with the channel of T_e that is used to send the message, allowing the message to flow through to component F 114.

In the example illustrated in stages D-H, arbiter C 124 is located in a terminal time zone, meaning T_e ends at time zone z. Under certain conditions, arbiters that are in terminal time zones can assume that a received message is destined for the terminal time zone. In general, if there is no mechanism for a message to flow out of a terminal time zone, the arbiter located in the time zone can assume that the associated time zone is the destination. However, some implementations can include one or more mechanisms that allow a message to flow out of a terminal time zone. For example, some implementations can allow messages to be redirected to another trunk direction (e.g., T_w, in the current example). As another example, when a terminal time zone serves as the junction, or interface, with an external link, messages can flow out along the external link. Put in terms of FIG. 1, if either the inter-processor or inter-node links (Xa_n, Xa_s, A1_e, or A1_w) were connected to arbiter C 124 instead of arbiter B 122, arbiter C 124 could not assume a message was destined for time zone z.

Stages I-O depict example operations for communicating with other processors located on the same node ("inter-processor communications") and other nodes ("inter-node communications"). In particular, stages I-M1/M2 depict a message being sent from component B 106 in time zone 1 to a processor or node that is one hop away from processor A1 102. Stages N1, N2, and O depict additional example operations for communicating with a processor or node that is more than one hop away from processor A1 102 (processor B2 150 in the current example).

At stage I, component B 106 sends, to arbiter A 120, a request indicating that a message is to be sent to processor B2 150. The operation(s) performed at stage I can be substantially similar to those described above at stage A. In particular, it is assumed that the request is pushed onto a circular queue maintained by arbiter A 120.

At stage J, arbiter A 120 determines whether to grant the request from component B 106. Arbiter A 120 first determines that the destination component is located on a different processor by comparing the node identifier and processor identifier indicated by the destination component identifier with the node identifier and processor identifier associated with arbiter A 120. If the destination node identifier differs from the arbiter's node identifier or the destination processor identifier differs from the arbiter's processor identifier, then the destination component is located on a different processor.

After determining that the destination component is on a different processor, arbiter A 120 determines if there is bandwidth available on one of the external links. As described above, access to the external links is controlled by tokens. Thus, in order to grant the request from component B 106, arbiter A 120 determines whether a token is available for the appropriate external link. The appropriate external link can vary depending on the number of hops and the availability of the external links. If the message destination is a single hop away (e.g., processor A2 130 or processor B1 140), the appropriate external link is the direct link to the destination processor. In the depicted computing system 100, for example, if the message destination was processor A2 130, then the appropriate external link would be link Xa_s; if the message destination was in processor B1 140, then the appropriate external link would be link A1_e. Further, if the message destination is in a processor on the same node, then the appropriate external link would be link Xa_s, regardless of the number of hops from the source processor.

For multi-hop, inter-node message destinations, such as processor B2 150, either external link can be used. However, some external links might get preference over others. For example, if inter-node links are slower or have less bandwidth than inter-processor links, the inter-node links might be given preference in order to prevent overloading an inter-node link at a different processor. For example, consider an implementation in which the X links have eight channels and the A links have four channels. If five messages destined for processor B2 150 were sent from processor A1 102 to processor A2 130, only four of the messages would be capable of being sent over link A2_e. By giving preference to A links, such a scenario is less likely to occur, resulting in more efficient resource usage.

Once arbiter A 120 determines the appropriate or preferred external link, arbiter A 120 determines whether a token is available for the external link. Because the tokens circulate between the arbiters, it might take multiple clock cycles before arbiter A 120 is able to obtain a token. How arbiter A 120 handles the absence of an available token can vary depending on the destination. When any of two or more external links can be used, but one or more external link is preferred, arbiter A 120 attempts to obtain a token for the preferred external link(s), and may wait multiple clock cycles for an available token. If a token for a preferred external link is not obtained within a certain number of clock cycles, arbiter A 120 obtains a token for any of the external links that can be used for the particular message.

Once arbiter A 120 obtains a token for an appropriate external link, arbiter A 120 removes the token from circulation, thus reserving bandwidth for the message on the external link associated with the obtained token. However, the external link is coupled to arbiter B 122, not arbiter A 120. Thus, the message travels from component B 106 to arbiter B 122 over T_e. As such, arbiter A 120 does not immediately grant the request from component B 106 upon obtaining the token. Rather, arbiter A 120 waits until bandwidth is also available on T_e. Thus, arbiter A 120 performs operations similar to those described above at stage E prior to granting the request from component B 106. In other words, arbiter A 120 might not grant the request for several clock cycles after obtaining the token. Further, if arbiter A 120 were not at the head of the trunk, arbiter A 120 might request a fixed reservation if bandwidth on the trunk could not be obtained within a certain number of clock cycles.

At stage K, the message flows to arbiter B 122 via T_e and arbiter A 120 indicates to component B 106 that the request was granted. The operations performed by arbiter A 120 to indicate to component B 106 that the request was granted can be similar to those described above at stage F. Similarly, the operations performed by arbiter A 120 to allow the message to flow to arbiter B 122 via T_e can be similar to those described above at stage F.

At stage L, arbiter B 122 receives the message metadata and performs arbitration operations based on the message metadata, allowing the message to pass through arbiter B 122. Arbiter B 122 can perform operations similar to those described at stage G to determine that the destination component is located in another processor. Additionally, because arbiter B 122 is the external link arbiter, arbiter B 122 determines which external link is associated with the token selected by arbiter A 120 at stage J. To determine that the token is associated with a particular external link, arbiter B 122 can analyze a link identifier contained in the message metadata or metadata associated with the token itself. Further, instead of selecting the input to a multiplexer associated with the eastern portion of T_e, arbiter B 122 selects an input to a multiplexer associated with the external link. For example, if arbiter A 120 took a token for link A1_e at stage J, arbiter B 122 selects an input to a multiplexer that has an output to link A1_e. The input selected by arbiter B 122 is one associated with the T_e channel that the message is sent on.

At stages M1 and M2, the message flows along the link associated with the token taken by arbiter A 120 at stage J. More particularly, if arbiter A 120 took a token for link A1_e, the message flows along link A1_e to processor B1 140, indicated by stage M1. If arbiter A 120 took a token for link Xa_s, the message flows along link Xa_s to processor A2 130, indicated by stage M2. Inter-processor and inter-node links can vary between implementations, and as such, the mechanisms by which the message flows along the respective link can vary accordingly. For example, the inter-processor link might use a different bus technology than the bus technology used for inter-node links.

If the message is sent over link A1_e, arbiter D 126, at stage N1, receives the message, determines the destination component, and performs operations that allow the message to flow to arbiter F 128 via link Xb_s. Similar to the trunk described above, the inter-processor and inter-node links can include latches for temporarily storing the message. Further, arbiter D 126 can receive the message metadata before receiving the message. The implementations of the inter-processor and inter-node links can vary from the trunk as well. For example, there may be no latches along link A1_e itself, while arbiter D 126 includes a latch or set of latches that form an input queue for messages received via link A1_e.

Arbiter D 126 can determine the destination component in a manner similar to that described above (e.g., at stage G). For example, arbiter D 126 can read the component destination identifier from the message metadata. Arbiter D 126 then compares the destination node and processor identifiers with the identifiers for node B and processor B1 140. If the destination node and processor identifiers are not the same as processor B1's node and processor identifiers, arbiter D 126 determines a link to allow the message to flow through to. For example, if the destination were a third node (not depicted), arbiter D 126 would determine a link that allows the message to flow through to the third node.

In this particular example, there are only two external links coming into arbiter D 126. As such, once arbiter D 126 determines that the destination component is not on processor B1 140, arbiter D 126 can allow the message to flow out via the only link that does not go back to the processor the message came from. In other words, if the message arrives via link A1_e and is not destined for processor B1 140, the only link available to send the message out is link Xb_s, as sending the message out via link A1_w would send it right back to where it came from.

If there are more than two external links leaving arbiter D 126, arbiter D 126 can perform operations similar to those described above, at stage J, for determining the initial external link. In other words, arbiter D 126 can determine the external link out of arbiter D 126 that arbiter D 126 would use for messages originating from the same time zone and destined for the same destination component as the current message. In some implementations, arbiter A 120 can determine a particular route to use and include an indication of the route with the message metadata. Thus, arbiter D 126 can analyze the indication of the route in the message metadata and determine the outgoing external link. In this particular example, arbiter D 126 determines that the message should flow to processor B2 150 via link Xb_s.

Once it is determined that the message should flow out to link Xb_s, arbiter D 126 obtains a token for link Xb_s before allowing the message to flow to link Xb_s. Because the processors do not coordinate with each other, processor A1 102 might continue to send messages to processor B1 140 even if arbiter D 126 is waiting for a token. To help prevent arbiter D 126 from not being able to obtain a token for link Xb_s, arbiter D 126 maintains a token in reserve. For example, if there are eight tokens available for link Xb_s, arbiter D 126 holds onto one, thus allowing only seven tokens to circulate. The reserved token is initially obtained as soon as possible and maintained while arbiter D 126 is operating. When a message comes in from link A1_e, arbiter D 126 first determines if there is an available token for link Xb_s in circulation. If arbiter D 126 cannot obtain a circulating token, arbiter D 126 uses the reserved token to allow the message to flow through to processor B2 150 via link Xb_s. In some implementations, arbiter D 126 checks to see if a circulating token is immediately available (i.e., is currently passing through arbiter D 126). In some implementations, arbiter D 126 waits a certain number of clock cycles before resorting to using the reserved token. The number of clock cycles can vary. For example, if arbiter D 126 has an input queue for messages coming into arbiter D 126 via external links, arbiter D 126 may decrease the number of clock cycles arbiter D 126 waits before resorting to using the reserved token as the queue fills up.

A token becomes immediately available again after the message that replaced the token is sent along the external link. As such, as soon as arbiter D 126 allows the message to flow through via link Xb_s, it can reserve the token again. Thus, arbiter D 126 can always have at least one reserved token available during each clock cycle. Further, arbiter D 126 can reserve more than one token as well. For example, if link Xb_s has eight channels available, arbiter D 126 might reserve four of the tokens, allowing only four to circulate. The specific number of tokens reserved by arbiter D 126 can be configured statically based on a variety of factors, such as the design of the computing system 100 and testing. The specific number of tokens reserved by arbiter D 126 can also be determined dynamically based on operating parameters, such as the amount of message traffic passing through arbiter D 126. For example, arbiter D 126 can be configured to determine that an application has processes running on both processor A1 102 and processor B2 150 that frequently communicate. Based on the knowledge that traffic might increase, arbiter D 126 can adjust the number of reserved tokens appropriately.

In some implementations, arbiter D 126 can be responsible for managing the external link tokens. If so, the reserved token is not necessarily an actual token. Arbiter D 126 might only allow the seven tokens to circulate (if there are eight channels on link Xb_s), which means that there is always one channel available, even if there is no corresponding token.

Once arbiter D 126 obtains a token for link Xb_s, arbiter D 126 performs operations that allow the message to flow to processor B2 150 via link Xb_s. Similar to the mechanisms described above, link A1_e can serve as an input into a multiplexer, while link Xb_s serves as the output to the multiplexer. Arbiter D 126 selects the multiplexer input associated with link A1_e, which allows the message to flow through to processor B2 150 via link Xb_s.

If the message is sent over link Xa_s, arbiter E 127, at stage N2, receives the message, determines the destination component, and performs operations that allow the message to flow to arbiter F 128 via link A2_w. Arbiter E 127 can perform similar operations as arbiter D 126 performs at stage N1, including utilizing reserve tokens. Once a token for link A2_e is obtained, the message flows to processor B2 150 via link A2_e.

At stage O, arbiter F 128 receives the message, determines the destination component, and performs operations that allow the message to flow to the destination component. Arbiter F 128 can receive the message in a similar manner as arbiter D 126 at stage N1. Similarly, arbiter F 128 can determine the destination component in a similar fashion. However, arbiter F 128 determines that the destination component is processor B2 150. Thus, arbiter F 128 does not determine an external link to allow the message to flow to, but rather an internal link. In particular, if arbiter F 128 determines that the destination component is within the same time zone as arbiter F 128, arbiter F 128 performs operations to allow the message to flow to the destination component, such as selecting a particular multiplexer input. If arbiter F 128 determines that the destination component is located in a different time zone (not depicted), arbiter F 128 performs operations to allow the message to flow to the destination time zone, such as determining in which direction along the trunk the time zone is located and selecting the associated multiplexer input.

If the destination component is in a different time zone, arbiter F 128 performs similar operations to those described above at stage E to utilize the trunk, such as determining whether bandwidth is available on the trunk. Arbiter F 128 can request a fixed reservation if no bandwidth is available on the trunk. Because arbiter F 128 cannot predict the number of messages it might receive via the external links, arbiter F 128 might request fixed reservations sooner for messages received via the external links than for requests from components within the same time zone.

Once the message is put on the trunk, the operations performed by other arbiters within processor B2 150 are similar to those performed by the arbiters of processor A1 102 for inter-time zone communications, described above.

The operations depicted in stages I-O depict a message being sent from component B 106 to processor B2 150, which is a multi-hop communication. Single hop communications are implemented similarly, but without the steps depicted in N1 and N2. In other words, if arbiter E 127 or arbiter D 126 are on the destination processor, the respective arbiter can perform the operations depicted at stage O to route the message to the proper component.

The above description presents an example embodiment(s) from which other embodiments or implementations can vary. For example, as mentioned above, arbiters 122, 126, 127, and 128 are functionally equivalent. Thus, they each would perform similar operations under the same circumstances. However, in some implementations, the processors and their functionality are not homogenous. Thus, while a subset of the processors of the system function as described above, a different subset of the processors of the system may function differently.

Additionally, while requests are not described as being denied or withdrawn, in some implementations an arbiter might actually deny a request, as opposed to allowing it to remain pending. Further, in some implementations, if a component request is not serviced within a certain time period, the component might withdraw the request.

In the above example, messages destined for processors one hop away are restricted to the link that couples the source and destination processors. For example, a message being sent from processor A1 102 to processor B1 140 always travels over link A1_e. However, some implementations can allow for multi-hop routes to processors that are one hop away. For example, the computing system 100 could be implemented to allow a message sent from processor A1 102 to processor B1 140 to travel to processor B1 140 via processor A2 130 and processor B2 150.

Additional variations can occur when additional nodes or processors exist. For example, consider an implementation in which both node A and node B have three processors (processor A3 and processor B3, respectively). If a message is sent from processor A1 102 to processor B3, the message can be sent across link Xa_s to processor A2 130 first, as described above. In some implementations, the message might then be sent across another link Xa_s again from processor A2 130 to processor A3 before crossing to processor B3 via A3_e (not depicted). In some implementations, messages are restricted to a single hop across an X link before crossing to another node. In other words, in some implementations, if a message destined for processor B3 first goes to processor A2 130, the message will always be directed across link A2_e to processor B2 150 and not allowed go through processor A3.

In general, as the number of processors and/or nodes increases, the number of available routes increases as well. Various rules can be implemented that restrict the routes that messages can take, which can simplify the arbiter logic and reduce unwanted side effects, such as deadlocks and congestion.

While no mechanism for fixed reservations is described above for tokens, the mechanisms used to implement fixed reservations for trunk bandwidth can be adapted to allow for fixed reservations for tokens. Further, while the messages associated with tokens (and thus, external links) travel over the same trunk channels as inter-time zone communications, some implementations can include dedicated trunk channels for messages destined for other processors.

The implementation of the inter-processor and inter-node links are not described in detail, as their implementation can vary greatly depending on the computing system 100. For example, if each node of the computing system 100 is a motherboard within a server, the inter-node links might use a PCI bus coupling the motherboards together. If each node of the computing system 100 is a mainframe, the inter-node links might use Fibre Channel or other networking technology. The arbiters of the computing system 100 can be adapted to permit use with the various different inter-node and inter-processor links as appropriate.

Further, FIG. 1 depicts the external links being coupled to arbiter B 122. However, the external links can be coupled to any of the arbiters. Further, the external links can be coupled to different arbiters. For example, the inter-processor links might be coupled to arbiter A 120 while the inter-node links might be coupled to arbiter C 124. Also, while the arbiter coupled with the external links (arbiter B 122 above) is described as being responsible for managing the tokens for the external links, any of the arbiters can be implemented to manage the tokens. In general, functionality described above for one arbiter can be adapted for other arbiters.

As mentioned above, arbiters can comprise multiple arbiters. For example, each arbiter might comprise an arbiter for each trunk direction. When a component requests use of the trunk, the component sends the request to the arbiter for the appropriate trunk direction. Similarly, there can be separate arbiters for each external link. Functionality for managing tokens and handling fixed reservations can be implemented as components separate from, or part of, the arbiters.

FIGS. 2-8 depict flowcharts of example operations for arbitrating intra-processor and inter-processor communications. The descriptions below assume that a message flows from the requesting component to the destination component (or any intermediate location) when the message is routed to the particular location without further operations. The descriptions below reference a current node, current processor, and current time zone. The current node, current processor, and current time zone are the node, processor, and time zone associated with the component performing the operations depicted.

Figure 2:
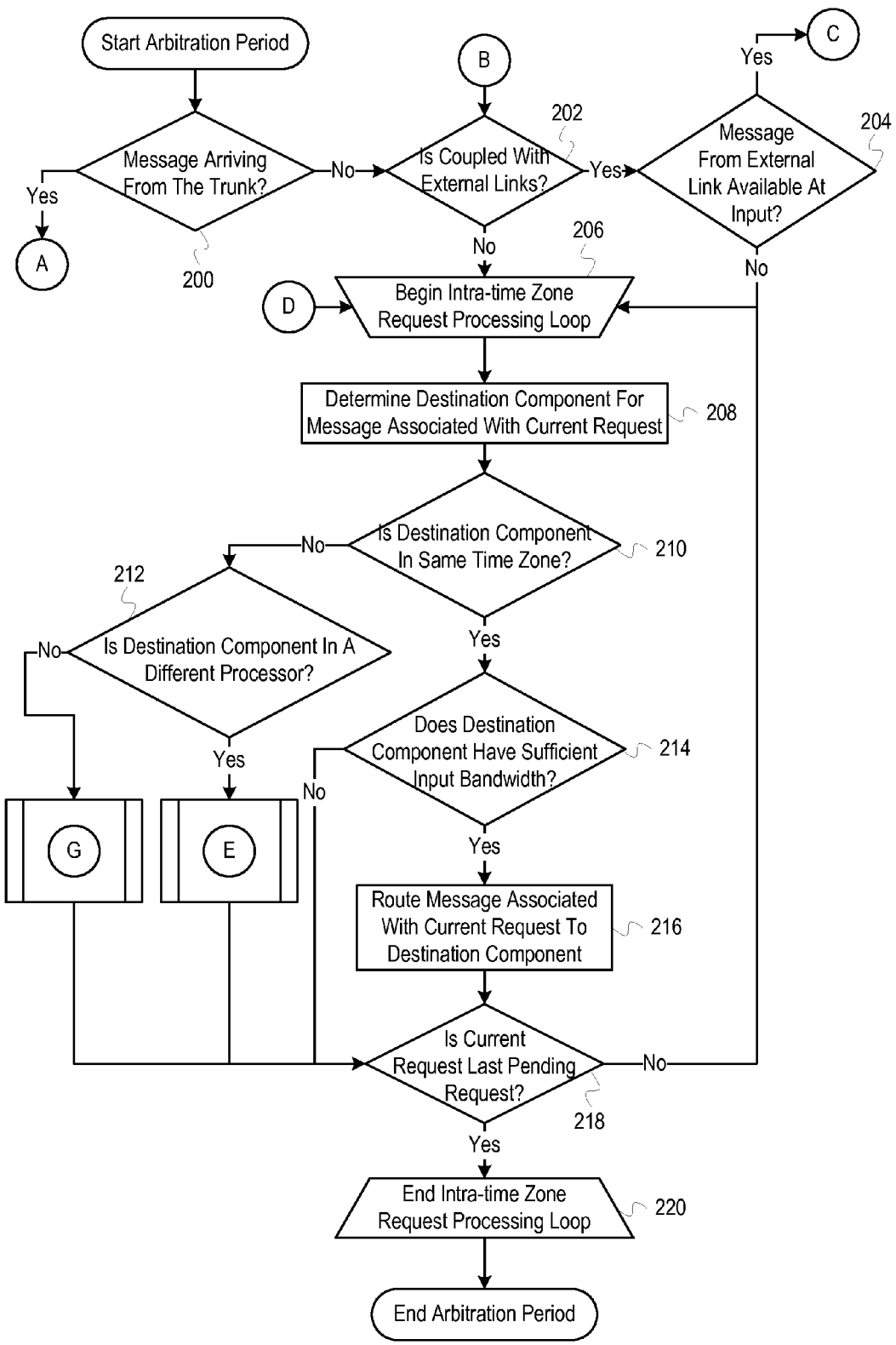
FIG. 2 depicts a flowchart of example operations for arbitrating processor communications.

FIG. 2 depicts a flowchart of example operations for arbitrating processor communications.

At block 200, it is determined whether at least one message is arriving from a trunk during the next clock cycle. To determine whether at least one message is arriving from the trunk during the next clock cycle, latches associated with each trunk channel are checked. If a message is arriving on a particular trunk channel, the latch associated with the particular trunk channel includes an indication that the message will be arriving. The indication can be a single Boolean value, the destination component identifier, etc. The latch can be on a trunk channel separate from the channel that carries an actual message, such as a channel that carries message metadata. If it is determined that no message is arriving from the trunk during the next clock cycle, control then flows to block 202. If it is determined that at least one message is arriving from the trunk during the next clock cycle, control flows to block 300 of FIG. 3.

At block 202, it is determined whether the trunk is coupled with one or more external links in the current time zone. Whether the current time zone includes a junction between the trunk and an external link can be a static setting or configurable setting. For example, a component within the current time zone can read a value from persistent memory or a boot process might set a value in a register accessible to a component within the current time zone. If it is determined that the current time zone includes a junction between the trunk and an external link, control then flows to block 204. If it is determined that the current time zone does not include a junction between the trunk and an external link, control then flows to block 206.

At block 204, it is determined whether a message from an external link is available on the external link. Whether a message from an external link is available on the external link can be determined differently depending on the implementation. For example, if messages received via an external link are put into one or more queues, the one or more queues can be checked to determine if there are any messages (or indications thereof) in the queues. If messages received via an external link are held in a latch, similar to messages received via a trunk, each latch associated with the one or more external links is checked for an indication that a message is stored in the latch or that the message will be arriving during a future clock cycle. If it is determined that no message from an external link is available on the external link, control then flows to block 206. If it is determined that a message from an external link is available on the external link, control then flows to block 400 of FIG. 4.

At block 206, a loop begins in which requests for use of the communications infrastructure are processed. During the loop, a queue of requests is iterated over. To facilitate the ability to "skip" requests that cannot be serviced during the current clock cycle, the queue can be a circular queue, in which skipped requests are pushed onto the back of the queue. The queue can also be a priority queue in which requests are ordered by the priority of the request. Priority can be based on the request type, length the request has been active, etc. The description below will discuss a circular queue implementation, but the operations discussed can be adapted to other implementations as appropriate.

The loop is initialized by selecting ("popping") the request at the head of the queue. After selecting the request at the head of the queue, the selected request becomes the "current" request and the request that was behind the current request in the queue becomes the head of the queue. At each iteration thereafter, the request at the head of the queue is selected as the new current request and is replaced as the head of the queue by the next request in the queue. During each iteration, an indication is made that the current request has been iterated over (i.e., skipped). Thus, if the request is inserted back into the queue and makes it to the head of the queue again, it is not iterated over a second time.

The request identifies the requesting component. Each request is associated with a message (hereinafter "current message"), and the request can also identify the destination component for the current message.

The loop can end under various conditions. For example, if the queue is empty, the loop ends. If the request at the head of the queue has already been iterated over, the loop ends. If, at any point in time, it can be determined that no more requests can be serviced, the loop ends.

After the current request, if unserviced, is inserted back into the queue and a new current request selected, control then flows to block 208.

At block 208, the destination component for the current message is determined. If the destination component for the current message is not specified by the request itself, the destination component identifier is read from an accessible location. The destination component identifier can be encoded as a value. For example, the destination component identifier can be encoded in a hierarchical manner in which a first set of bits identifies the node containing the destination component, a second set of bits identifies the processor containing the destination component, and a third set of bits identifies the time zone containing the destination component, and a fourth set of bits indicates the component itself. When a particular set of bits is relevant to a decision, the set of bits can be read individually. Further, instead of the different parts of the destination component identifier being stored as a single value, the parts of the destination component identifier can be specified as individual values as well. The discussion below will assume that the destination component identifier identifies the node, the processor on the indicated node, the time zone of the processor, and the component itself, or can be used to otherwise determine the aforementioned data. After the destination component identifier is read and any decoding of the destination component identifier performed, control then flows to block 210.

At block 210, it is determined whether the destination component is in the same time zone as the requesting component. Whether the destination component is in the same time zone as the requesting component can be determined by comparing the node, processor, and time zone identifiers for the destination component with the node, processor, and time zone identifiers of the requesting component. If the corresponding identifiers are equal, the destination component is in the same time zone as the requesting component. If the values are not equal, the destination component is not in the same time zone as the requesting component. If it is determined that the destination component is not in the same time zone as the requesting component, control then flows to block 212. If it is determined that the destination component is in the same time zone as the requesting component, control then flows to block 214.

At block 212, it is determined whether the destination component is located in a different processor. To determine whether the destination component is located in a different processor, the node and processor identifiers for the destination component can be compared with the node and processor identifiers of the requesting component. If either the node identifier or processor identifier of the requesting component differs from the node identifier or processor identifier of the destination component, the destination component is located in a different processor. If it is determined that the destination component is located in a different processor, control then flows to block 500 of FIG. 5. If it is determined that the destination component is not located in a different processor, control then flows to block 700 of FIG. 7.

Control flowed to block 214 if it was determined, at block 210, that the destination component is located in the same time zone as the requesting component. At block 214, it is determined whether the destination component has sufficient input bandwidth to receive the current message. For example, if the destination component has two inputs available and other messages have been routed to both, the destination component does not have sufficient input bandwidth to receive the current message. The amount of input bandwidth available at the destination component can be determined by comparing a value indicating the number of messages already routed to the destination component with a value indicating the maximum number of messages the destination component can receive in one clock cycle. If it is determined that the destination component has sufficient input bandwidth to receive the current message, control then flows to block 216. If it is determined that the destination component does not have sufficient input bandwidth to receive the current message, control then flows to block 218.

At block 216, the current message is routed to the destination component. If control flowed to block 216, it was determined, at block 210, that the destination component is in the same time zone, thus allowing the current message to be routed to the destination component directly. The requesting component and destination component can be coupled together via one or more multiplexers. To route the current message to the destination component, inputs to the one or more multiplexers are selected such that the current message flows through the multiplexer from the requesting component to the destination component. Once the current message is routed to the destination component, control then flows to block 218.

Control flowed to block 218 if it was determined, at block 214, that the destination component did not have sufficient input bandwidth to receive the current message. Control also flowed to block 218 from block 216. At block 218, it is determined whether the current request is the last pending request. The last pending request can be the last request in the queue, the last request that has not been iterated over, etc. For example, if there are still requests in the queue, but the request at the head of the queue has been iterated over, the current request is the last pending request. In implementations that have functionality to determine that no more requests can be serviced, the current request is considered the last pending request if no more requests can be serviced. Further, if block 218 was reached directly from block 214, the current request is inserted at the tail of the queue. Similarly, if the subroutines depicted in FIGS. 5-7 were exited without servicing the current request, the current request is inserted at the tail of the queue. In other words, if the current request was not serviced at block 216 or in a subroutine, the current request is put back into the queue for the next arbitration period. If the current request is the last pending request, control then flows to block 220. If the current request is not the last pending request, control flows back to block 206.

At block 220, the loop in which the pending requests are processed ends. At the end of the loop, all pending requests have either been serviced, such that no more are left in the queue; all requests remaining in the queue have been iterated over (but not serviced); or no more requests can be serviced. After the loop in which the pending requests are processed ends, the process ends as well.

Figure 3:
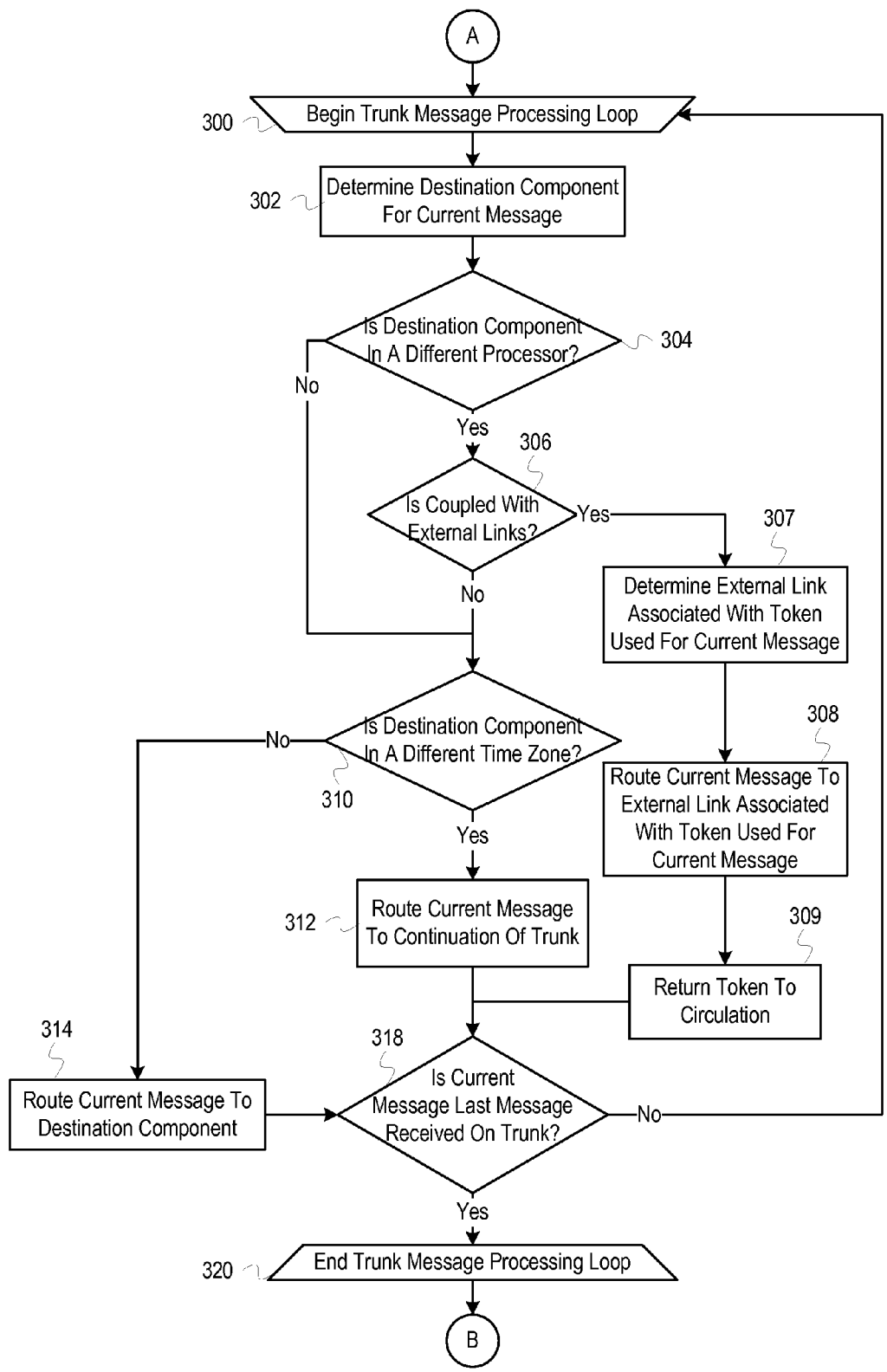
FIG. 3 depicts a flowchart of example operations for arbitrating messages received via a trunk.

FIG. 3 depicts a flowchart of example operations for arbitrating messages received via a trunk.

Control flowed to block 300 if it was determined, at block 200 of FIG. 2, that at least one message is arriving via the trunk. At block 300, a loop begins in which one or more messages received via a trunk are routed through a time zone according to the messages destinations. Each trunk channel is associated with a latch that holds message metadata about an incoming message (if there is an incoming message on the respective trunk channel). The incoming message associated with the metadata in the latch might arrive one or more clock cycles after the data. In other words, the metadata can precede the message itself, allowing the arbitration to be performed prior to receiving the actual message.

To route the one or more messages, each latch associated with the trunk channels is checked for metadata. If a particular latch does not contain metadata (or contains metadata associated with a previously processed message), the latch is skipped. If a particular latch does contain metadata (or contains metadata associated with an unprocessed message), the metadata is processed for the purposes of routing the incoming message.

To initialize the loop, the first latch found with metadata becomes the current latch. The current latch contains metadata indicating the destination component of a message. The message associated with the current latch is referred to as the "current message". During each additional pass through the loop, the current latch is updated to the next latch that contains new metadata. Similarly, the message associated with the new current latch becomes the new current message. Additionally, before moving on to a new latch, the current latch metadata can be invalidated or another indication made indicating that the current latch has been iterated over. For example, a particular bit of the latch can be set to a particular value (e.g., 0 or 1), all bits of the latch set to 0, etc.

Once the current latch has been initialized or updated, control then flows to block 302.

At block 302, the destination component for the current message is determined. The destination component can be determined using operations similar to those described above at block 208. For example, the destination component can be determined by looking at various sets of bits of the metadata stored in the current latch that identify the destination component. The value stored in the current latch might also be used as an index into a routing table that indicates how the current message should be routed. In other words, the current message metadata includes a destination component identifier, similar to a request. After the destination component for the current message is determined, control then flows to block 304.

At block 304, it is determined whether the destination component is located in a different processor. Similar to the operations described above at block 212, the destination processor identifier can be compared with an identifier of the current processor. If the destination processor identifier differs from the current processor identifier, the destination component is located in a different processor. If the destination processor identifier is the same as the current processor identifier, the destination component is located within the same processor. If it is determined that the destination component is in a different processor, control flows to block 306. If it is determined that the destination component is in the same processor, control then flows to block 310.

At block 306, it is determined whether the trunk is coupled with one or more external links in the current time zone. Whether the current time zone includes a junction between the trunk and an external link can be determined as described above at block 202. If it is determined that the current time zone includes a junction between the trunk and an external link, control then flows to block 307. If it is determined that the current time zone does not include a junction between the trunk and an external link, control then flows block 310.

At block 307, the external link that is associated with a token used for the current message is determined. When a request for a message is to be sent via an external link, a token for the particular external link is obtained. An identifier of the external link (or the token itself) is then sent with the message metadata (or in place of the token). The external link associated with the token can thus be determined by reading the external link identifier from a storage location, such as a latch. The external link identifier can indicate a specific channel on the external link. If the specific channel on the external link is not identified, any available external link channel (i.e., any external link channel that is not already dedicated to a message) can be used. The external link identification can be a subset of the token data itself. In other words, if a used token circulates with the message, the token can include the external link identification. After the external link associated with the token used for the current message is determined, control then flows to block 308.

At block 308, the current message is routed to the external link determined at block 307. The trunk channel associated with the current message can be coupled to the external link using one or more multiplexers. To route the current message to the external link, inputs to the one or more multiplexers are selected such that the current message flows from the trunk channel to the external link via the multiplexer outputs. After the current message is routed to the external link, control then flows to block 309.

At block 309, the token used to reserve bandwidth on the external link is returned to circulation. How the token is returned to circulation can vary between implementations. For example, if the token continues to circulate through the time zones along with an indication that the token is being used, the indication that the token is being used can be updated to reflect the fact that it is now available. If the token is taken out of circulation, the token can be "recreated" and put back into circulation. If another component manages the tokens, an indication that the token can be returned to circulation can be sent to the component that manages the tokens. After the token is returned to circulation, control then flows to block 318.

Control flowed to block 310 if it was determined, at block 304, that the destination component is in the same processor. Control also flowed to block 310 if it was determined, at block 306, that the current time zone does not include a junction between the trunk and an external link. At block 310, it is determined whether the destination component is located in a time zone different from the current time zone. To determine whether the destination component is located in a different time zone from the current time zone, the current time zone identifier can be compared with the destination component time zone identifier. If the current time zone identifier is the same as the destination time zone identifier, the destination component is in the same time zone. If the current time zone identifier is different than the destination time zone identifier, the destination component is in a different time zone. If it is determined that the destination component is in a different time zone from the current time zone, control then flows to block 312. If it is determined that the destination component is in the same time zone as the current time zone, control then flows to block 314.

At block 312, the current message is routed to the continuation of the trunk. In other words, the current message is routed to pass through the current time zone, allowing the current message to continue in the same direction along the trunk. The trunk channel on which the current message is being sent can be coupled to the continuation of the trunk using one or more multiplexers. To route the current message to the continuation of the trunk, inputs to the one or more multiplexers are selected such that the current message flows from the trunk channel it was received on to the continuation of the trunk via the multiplexer outputs. After the current message is routed to the continuation of the trunk, control then flows to block 318.

Control flowed to block 314 if it was determined, at block 310, that the destination component is in the same time zone as the current time zone. At block 314, the current message is routed to the destination component. The trunk channel associated with the current message can be coupled to the destination component via one or more multiplexers. To route the current message to the destination component, inputs to the one or more multiplexers are selected such that the current message flows from the trunk channel it was received on to an input of the destination component via the one or more multiplexers. After the current message is routed to the destination component, control then flows to block 318.

Control flowed to block 318 from blocks 309, 312, and 314. At block 318, it is determined whether the current message is the last message received on the trunk. In other words, it is determined whether all trunk channels have been iterated through. If all trunk channels have been iterated through, control then flows to block 320. If not all trunk channels have been iterated through, control then flows back to block 300.

At block 320, the loop in which one or more messages received via the trunk are routed through the time zone ends. At the end of the loop, all messages received via the trunk have been routed to further the messages progress to the destination components. After the loop ends, control flows back to block 202 of FIG. 2.

Figure 4:
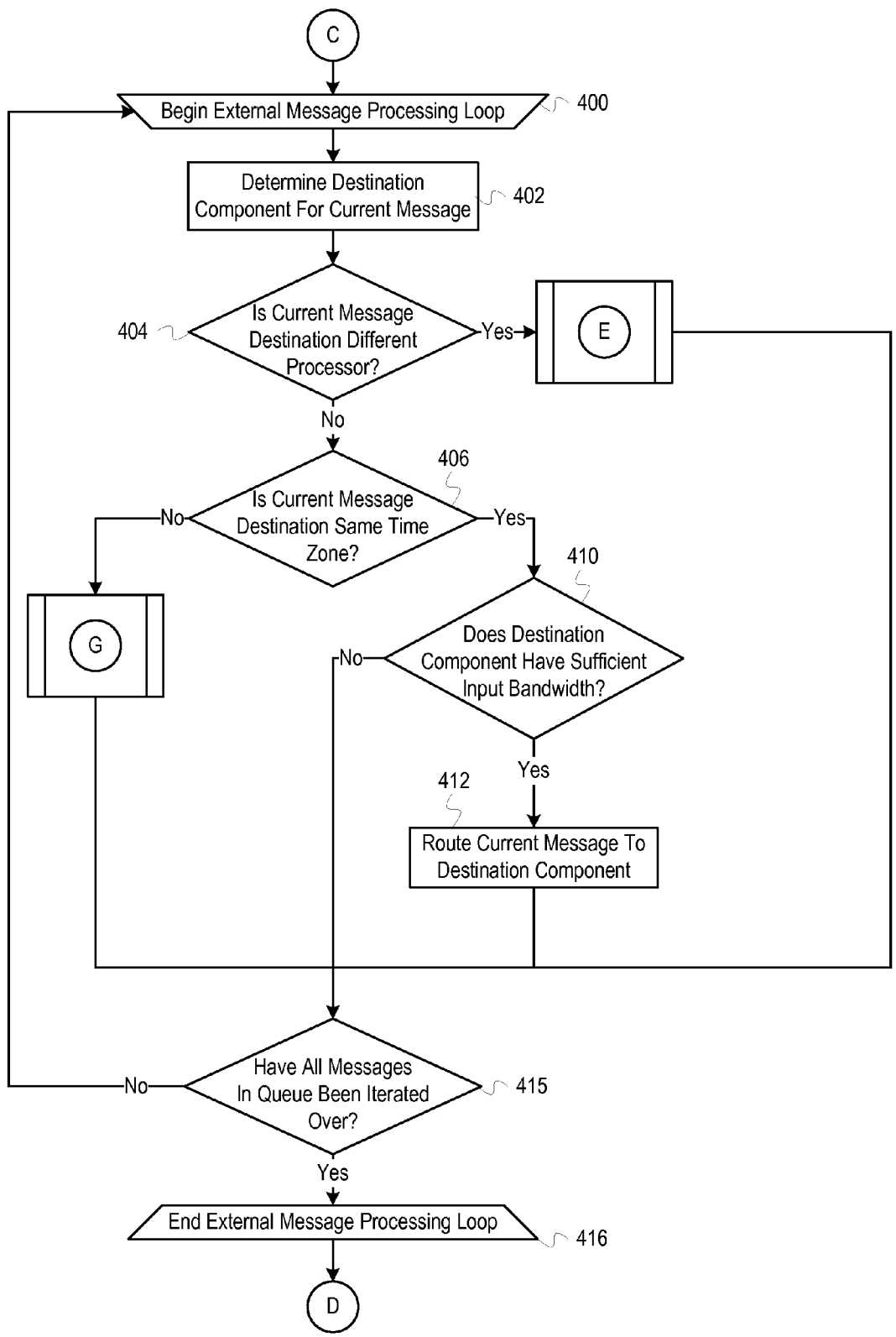
FIG. 4 depicts a flowchart of example operations for arbitrating messages received via an external link.

FIG. 4 depicts a flowchart of example operations for arbitrating messages received via an external link.

Control flowed to block 400 if it was determined, at block 204 of FIG. 2, that at least one message from an external link is available at an external link input. At block 400, a loop begins in which messages received via one or more external links are processed and routed towards their destinations. The loop iterates through each message received via the external links. As described above, the messages can be received and put into one or more queues. Further, similar to the trunk mechanism, message metadata can be received prior to the actual message, allowing the arbitration decisions related to the actual message to be performed prior to receipt of the message itself. For the discussion below, it is assumed that all messages are received into a circular queue, similar to message requests, and that the message and message metadata are received at the same time.

The loop is initialized by selecting ("popping") the first message from the head of the queue as the current message. After selecting the first message from the head of the queue, the second message in the queue becomes the new head of the queue. At each iteration thereafter, if the current message is unserviced, the current message is pushed back onto the tail of the queue. Further, at each iteration thereafter, the current message is updated by selecting the message at the head of the queue as the current message. After the loop is initialized, control then flows to block 402.

At block 402, the destination component for the current message is determined. The destination component can be determined using operations similar to those described above at blocks 208 and 302. For example, the destination component can be determined by looking at the destination component identifier included in the current message metadata. After the destination component for the current message is determined, control then flows to block 404.

At block 404, it is determined whether the destination component is located in a different processor than the current processor. Similar to the operations described above at blocks 212 and 304, the destination processor identifier can be compared with the current processor identifier. If the destination processor identifier differs from the current processor identifier, the destination component is located in a different processor. If the destination processor identifier is the same as the current processor identifier, the destination component is located within the same processor. If it is determined that the destination component is located in a different processor than the current processor, control flows to block 500 of FIG. 5. If it is determined that the destination component is located in the current processor, control then flows to block 406.

At block 406, it is determined whether the destination component is located in a different time zone than the current time zone. Similar to the operations described above at block 310, the destination time zone identifier can be compared with the current time zone identifier. If the destination time zone identifier differs from the current time zone identifier, the destination component is located in a different time zone than the current time zone. If the destination time zone identifier is the same as the current time zone identifier, the destination component is located in the current time zone. If it is determined that the destination component is the current time zone, control then flows to block 410. If it is determined that the destination component is located in a different time zone than the current time zone, control then flows to block 700 of FIG. 7.

At block 410, it is determined whether the destination component has sufficient input bandwidth to receive the current message. The determination of whether the destination component has sufficient input bandwidth to receive the current message can be made in a substantially similar manner as done at block 214, described above. If it is determined that the destination component has sufficient input bandwidth to receive the current message, control then flows to block 412. If it is determined that the destination component does not have sufficient input bandwidth to receive the current message, control flows to block 415.

At block 412, the current message is routed to the destination component. The channel of the external link on which the current message was received can be coupled with an input of the destination component using one or more multiplexers. To route the current message to an input of the destination component, inputs to the one or more multiplexers are selected such that the current message flows from the external link to the input of the destination component via the one or more multiplexers. After the current message is routed to the destination component, control then flows to block 415.

Control flowed to block 415 if it was determined, at block 410, that the destination component does not have sufficient input bandwidth to receive the current message. Control also flowed to block 415 from block 412 and from the subroutines depicted in FIGS. 5-7. At Block 415, it is Determined Whether there are any Additional messages in the queue that have not been iterated over. For example, there may be messages in the queue that were iterated over but not serviced due to trunk or component input congestion. To determine if all messages in the queue have been iterated over, the message at the head of the queue can be checked for an indication that the message has been iterated over. If the message at the head of the queue includes an indication that the message has been iterated over, all messages in the queue have been iterated over. If no message exists in the queue, all messages have been iterated over as well. If all messages in the queue have been iterated over, control then flows to block 416. If not all messages in the queue have been iterated over, control then flows back to block 400.

At block 416, the loop in which the messages received from the one or more external links are processed ends. At the end of the loop, all serviceable messages have been routed towards their destination, while all unserviceable messages have been reinserted into the queue. After the loop ends, control then flows to block 206 of FIG. 2.

Figure 5:
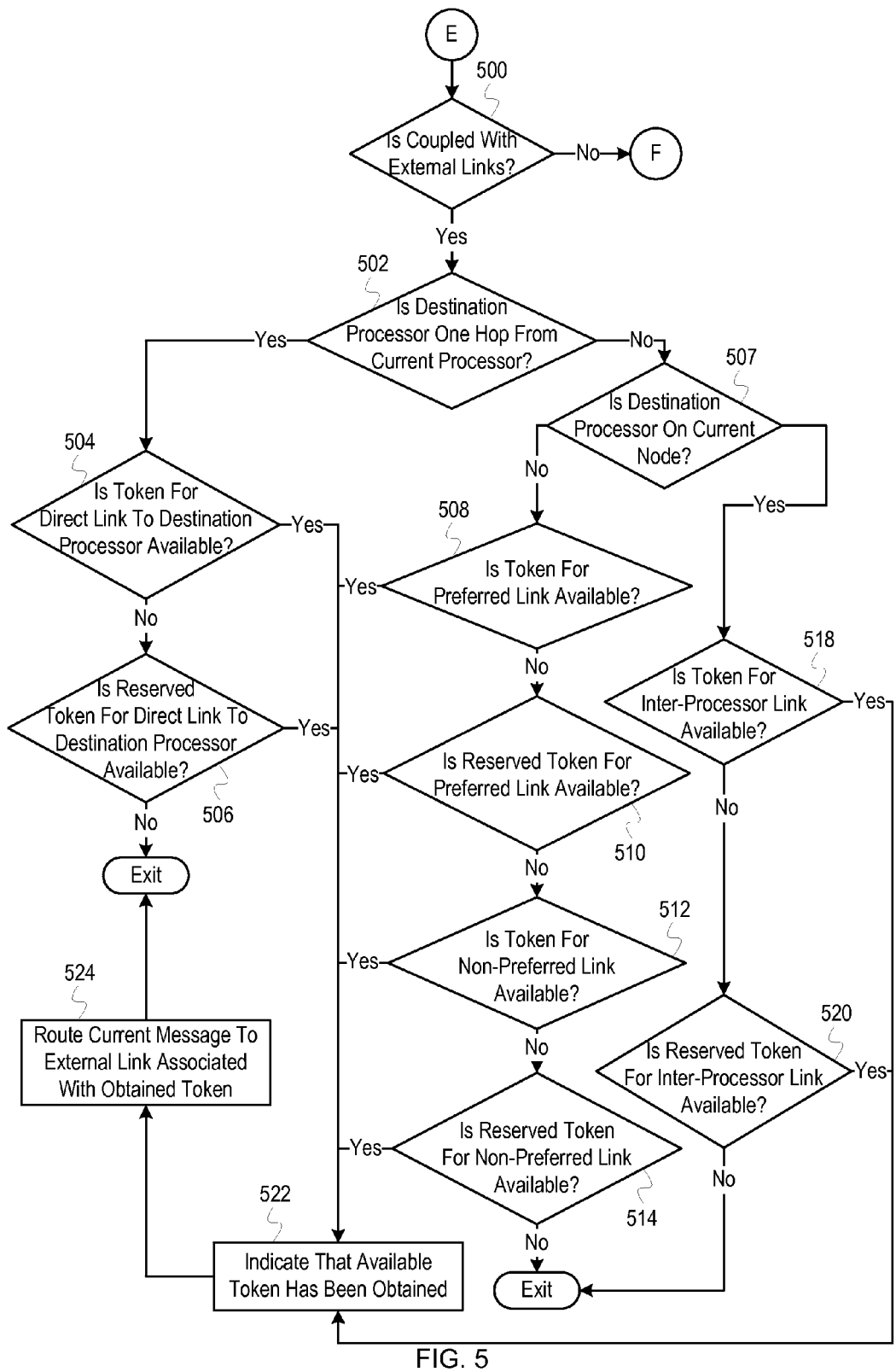
FIG. 5 depicts a flowchart of example operations for obtaining a token to reserve bandwidth on an external link by a component coupled to the external link.
Figure 6:
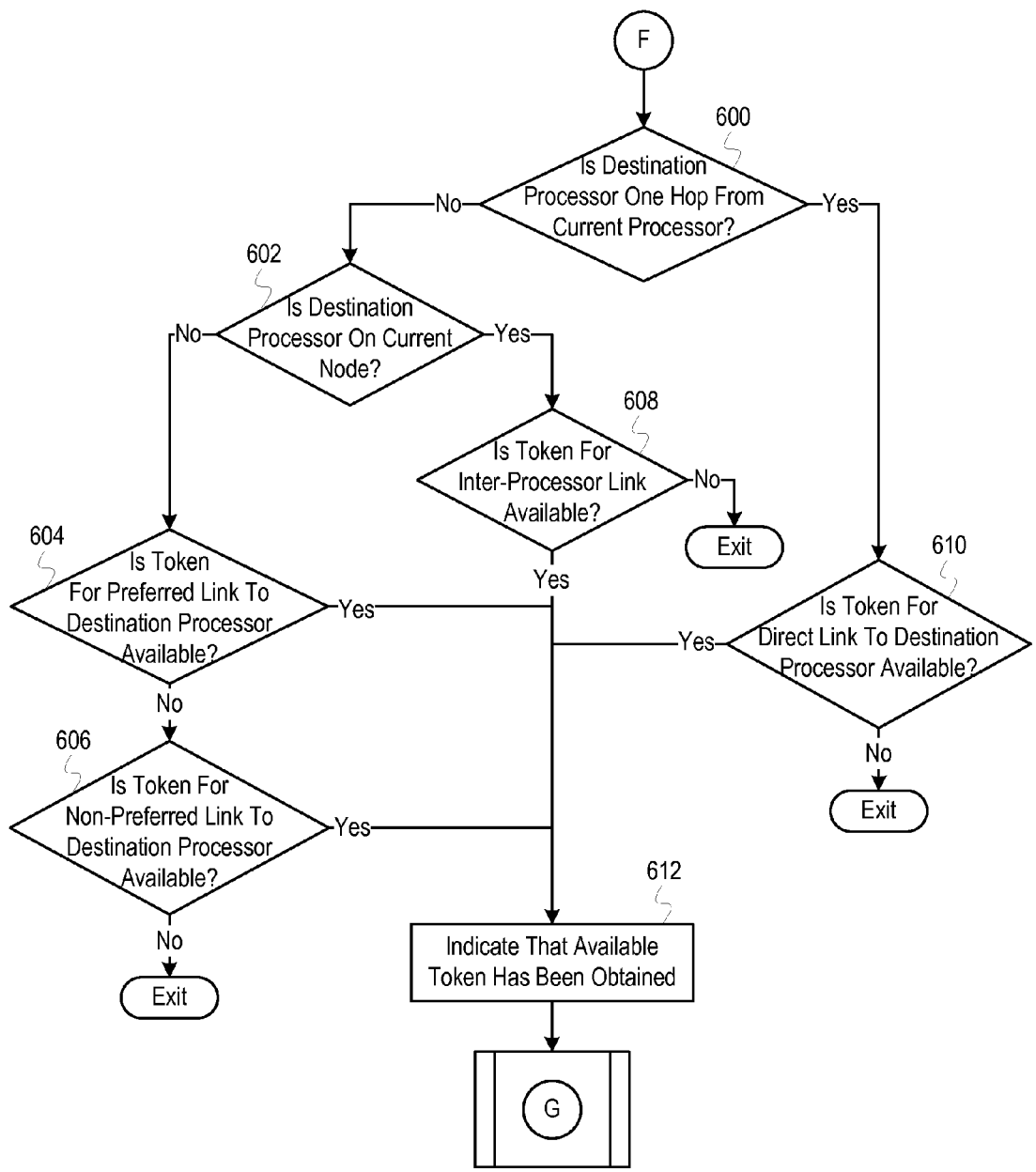
FIG. 6 depicts a flowchart of example operations for obtaining a token to reserve bandwidth on an external link by a component not coupled to an external link.

FIGS. 5 and 6 depict flowcharts of example operations for obtaining a token to reserve bandwidth on an external link. The operations depicted in FIGS. 5 and 6 are illustrated as a subroutine used by other processes. However, the operations depicted in FIGS. 5 and 6 can be implemented as an independent process as well. When the subroutine exits, control flows back to the calling process.

FIG. 5 depicts a flowchart of example operations for obtaining a token to reserve bandwidth on an external link by a component coupled to the external link.

Control flowed to block 500 if it was determined, at block 212 of FIG. 2 and block 404 of FIG. 4, that the destination of the current message is located in a different processor. At block 500, it is determined whether the trunk is coupled with one or more external links in the current time zone. Whether the current time zone includes a junction between the trunk and an external link can be determined as described above at block 202. If it is determined that the current time zone includes a junction between the trunk and an external link, control then flows to block 502. If it is determined that the current time zone does not include a junction between the trunk and an external link, control then flows block 600 of FIG. 6.

At block 502, it is determined whether the destination processor is one hop from the current processor. To determine whether the destination processor is one hop from the current processor, the destination node and destination processor identifiers can be compared to the current node and current processor identifiers. If the destination node and current node identifiers are the same, the destination processor is on the same node. The current processor identifier and the destination processor identifier are then compared to determine if the destination processor is one hop away from the current processor. For example, if the processors within a node are identified by linear identifiers corresponding to the processors' locations along the inter-processor link, adjacent processors can have sequential identifiers (e.g., x and x+1). Thus, if the current processor identifier and the destination processor identifier are sequential, the current processor and the destination processor are one hop from each other.

If the destination node identifier is different than the current node identifier, a similar technique can be used if adjacent nodes (along an inter-node link) are identified by linear, sequential identifiers. If the current node identifier and the destination node identifier are sequential, the current processor identifier and the destination processor identifier are compared to determine if the current processor and destination processor correspond to each other. If the current processor identifier and the destination processor identifier are the same, then the current processor and destination processor correspond to each other and are one hop away.

The technique used to determine whether the destination processor is one hop from the current processor can vary. For example, the operations used to dynamically determine whether the destination processor is one hop from the current processor can vary depending on the implementation of node and processor identifiers. Further, in some implementations, a table, database, or other data source can be queried to determine whether the destination processor is one hop from the current processor. If it is determined that the destination processor is one hop from the current processor, control then flows to block 504. If it is determined that the destination processor is more than one hop from the current processor, control then flows to block 507.

At block 504, it is determined whether a token for a direct link to the destination processor is available. As the tokens circulate, they can be stored in a latch at each time zone. Additionally, there can be a latch for each type of token at each time zone. In other words, if there are two types of external links, each time zone can include a latch that holds an available token for each external link. Further, if the tokens are split between trunk directions, arbiters can have a latch for each link and trunk direction. To determine if a token for a direct link to the destination processor is available, the latch associated with direct link tokens is checked for metadata indicating that a direct link token is available. If it is determined that a token for a direct link to the destination processor is available, control then flows to block 522. If it is determined that a token for a direct link to the destination processor is not available, control then flows to block 506.

At block 506, it is determined whether a reserved token for the direct link to the destination processor is available. Reserved tokens are tokens associated with bandwidth on an external link that are not circulated for use by other arbiters. The number of reserved tokens can be maintained in a counter, and each external link has a respective counter. Each time a reserved token is used to transmit a message over an external link, the counter is decremented. After the arbitration period ends, the counter is reset to the total number of reserved tokens. Thus, to determine whether a reserved token for the direct link to the destination processor is available, it is determined whether the value stored in the counter associated with the external link is zero. If the counter value is zero, all reserve tokens for that particular external link have been used. If the counter value is greater than zero, at least one reserve token for the particular external link is available. If it is determined that a reserved token for the direct link to the destination processor is available, control then flows to block 522. If it is determined that no reserved tokens for the direct link to the destination processor are available, the subroutine exits.

Control flowed to block 507 if it was determined, at block 502, that the destination processor is greater than one hop from the current processor. At block 507, it is determined whether the destination processor is on the current node. To determine if the destination processor is on the current node, the destination node identifier can be compared to the current node identifier. If the destination node identifier is the same as the current node identifier, the destination processor is on the current node. If the destination node identifier is not the same as the current node identifier, the destination processor is not on the current node. If it is determined that the destination processor is not on the current node, control then flows to block 508. If it is determined that the destination processor is on the current node, control then flows to block 518.

At block 508, it is determined whether a token for a preferred link along a route to the destination processor is available. As described above at stage J of FIG. 1, when multiple routes are available to a destination processor, some external links might be preferred over other external links. Which external link is the preferred link can be specified statically (e.g., hard coded into the logic) or specified dynamically (e.g., as a configurable option). Whether a token for the preferred link is available can be determined by reading metadata from a latch associated with the preferred link. If multiple links are preferred or multiple routes are available, metadata stored in a latch associated with each preferred link or available route can be read until one is found or all have been read. If multiple links are preferred, the links can be ordered by preference, and the metadata stored in the associated latches can be read in the same order. If it is determined that no token for a preferred link along a route to the destination processor is available, control then flows to block 510. If it is determined that a token for a preferred link along a route to the destination processor is available, control then flows to block 522.

At block 510, it is determined whether a reserved token for a preferred link along a route to the destination processor is available. Whether a reserved token is available for a preferred link along a route to the destination processor is available can be determined by determining whether a value in a counter is greater than zero. The counter indicates the number of unused reserved tokens for the preferred link. If the counter is greater than zero, a reserved token for the preferred link is available. If the counter is equal to zero, no reserved tokens for the preferred link are available. Because multiple preferred links and multiple routes might exist, multiple counters can be checked to determine if a reserved token is available. If the preferred links are ordered by preference, the associated counters can be checked in the same order. If it is determined that no reserved token for a preferred link along a route to the destination processor is available, control then flows to block 512. If it is determined that a reserved token for a preferred link along a route to the destination processor is available, control then flows to block 522.

At block 512, it is determined whether a token for a non-preferred link along a route to the destination processor is available. Whether a token for the non-preferred link is available can be determined by reading metadata from a latch associated with the non-preferred link. If multiple non-preferred links are available or multiple routes are available, metadata stored in a latch associated with each non-preferred link or available route can be read until one is found or all have been read. If it is determined that no token for a preferred link along a route to the destination processor is available, control then flows to block 514. If it is determined that a token for a non-preferred link along a route to the destination processor is available, control then flows to block 522.

At block 514, it is determined whether a reserved token for a non-preferred link along a route to the destination processor is available. Whether a reserved token is available for a non-preferred link along a route to the destination processor is available can be determined by determining whether a value in a counter is greater than zero. The counter indicates the number of unused reserved tokens for the non-preferred link. If the counter is greater than zero, a reserved token for the non-preferred link is available. If the counter is equal to zero, no reserved tokens for the non-preferred link are available. If multiple non-preferred links or multiple routes exist, multiple counters can be checked to determine if a reserved token for a non-preferred link is available. If it is determined that a reserved token for a preferred link along a route to the destination processor is available, control then flows to block 522. If it is determined that no reserved token for a preferred link along a route to the destination processor is available, the subroutine exits.

Control flowed to block 518 if it was determined, at block 507, that the destination processor is on the current node. At block 518, it is determined whether a token for an inter-processor link is available. An inter-processor link is a particular external link that couples processors on the same node together. To determine whether a token for an inter-processor link is available, metadata in a latch associated with the inter-processor link can be read. If multiple inter-processor links are available, one of the inter-processor links can be selected by determining which inter-processor link would get the message nearest to the destination processor. The particular inter-processor link of the multiple inter-processor links can be determined by comparing the current processor identifier with the processor identifier associated with a processor at the other end of the inter-processor link, querying a routing table, etc. If it is determined that a token for an inter-processor link is not available, control then flows to block 520. If it is determined that a token for an inter-processor link is available, control then flows to block 522.

At block 520, it is determined whether a reserved token for an inter-processor link is available. Whether a reserved token for an inter-processor link is available can be determined by determining whether a value in a counter is greater than zero. The counter indicates the number of unused reserved tokens for the inter-processor link. If the counter is greater than zero, a reserved token for the inter-processor link is available. If the counter is equal to zero, no reserved tokens for the inter-processor link are available. As described at block 518, if multiple inter-processor links are available, one of the multiple inter-processor links can be selected. If it is determined that a reserved token for an inter-processor link is available, control then flows to block 522. If it is determined that no reserved token for an inter-processor link is available, the subroutine ends.

Control flowed to block 522 if it was determined, at any of blocks 504, 506, 508, 510, 512, 514, 518, and 520, that a particular token was available. At block 522, it is indicated that the particular available token has been obtained. The technique used to indicate that the particular token has been obtained can vary depending on the implementation. For example, the metadata in the latch associated with the particular token can be reset to a null value or a particular bit or set of bits in the latch can be updated to indicate that the particular token has been obtained. The particular token varies according to which block control flowed from. After it has been indicated that the particular token has been obtained, control then flows to block 524.

At block 524, the current message is routed to the external link associated with the obtained token. The external link on which the current message was received can be coupled to the external link associated with the obtained token using one or more multiplexers. To route the current message to the external link associated with the obtained token, inputs to the one or more multiplexers are selected such that the current message flows from the external link from which it was received to a channel on the external link associated with the obtained token via the multiplexer outputs. After the current message is routed to the external link associated with the obtained token, the subroutine exits.

FIG. 6 depicts a flowchart of example operations for obtaining a token to reserve bandwidth on an external link by a component not coupled to an external link.

Control flowed to block 600 if it was determined, at block 500 of FIG. 5, that the current time zone does not include a junction between the trunk and an external link. At block 600, it is determined whether the destination processor is one hop from the current processor. Whether the destination processor is one hop from the current processor can be determined in a manner substantially similar to that described at block 502 of FIG. 5. If it is determined that the destination processor is more than one hop from the current processor, control then flows to block 602. If it is determined that the destination processor is one hop from the current processor, control then flows to block 610.

At block 602, it is determined whether the destination processor is on the current node. Whether the destination processor is on the current node can be determined in a manner substantially similar to that described at block 507 of FIG. 5. If it is determined that the destination processor is not on the current node, control then flows to block 604. If it is determined that the destination processor is on the current node, control then flows to block 608.

At block 604, it is determined whether a token for a preferred link along a route to the destination processor is available. Whether a token for a preferred link along a route to the destination processor is available can be determined in a manner substantially similar to that described at block 508 of FIG. 5. If it is determined that a token for a preferred link along a route to the destination processor is not available, control then flows to block 606. If it is determined that a token for a preferred link along a route to the destination processor is available, control then flows to block 612.

At block 606, it is determined whether a token for a non-preferred link along a route to the destination processor is available. Whether a token for the non-preferred link is available can be determined in a manner substantially similar to that described at block 512 of FIG. 5. If it is determined that a token for a non-preferred link along a route to the destination processor is available, control then flows to block 612. If it is determined that no token for a preferred link along a route to the destination processor is available, the subroutine exits.

Control flowed to block 608 if it was determined, at block 602, that the destination processor is on the current node. At block 608, it is determined whether a token for an inter-processor link is available. Whether a token for an inter-processor link is available can be determined in a manner substantially similar to that described at block 518 of FIG. 5. If it is determined that a token for an inter-processor link is available, control then flows to block 612. If it is determined that a token for an inter-processor link is not available, the subroutine exits.

Control flowed to block 610 if it was determined, at block 600, that the destination processor is one hop from the current processor. At block 610, it is determined whether a token for a direct link to the destination processor is available. Whether a token for a direct link to the destination processor is available can be performed in a manner substantially similar to that described at block 504 of FIG. 5. If it is determined that a token for a direct link to the destination processor is available, control then flows to block 612. If it is determined that there is a token for a direct link to the destination processor is not available, the subroutine exits.

Control flowed to block 612 if it was determined, at any of blocks 604, 606, 608, and 610, that a particular token was available. At block 612, it is indicated that the particular available token has been obtained. The technique used to indicate that the particular token has been obtained can be substantially similar to the technique(s) described at block 522 of FIG. 5. After it has been indicated that the particular token has been obtained, control then flows to block 700 of FIG. 7.

Figure 7:
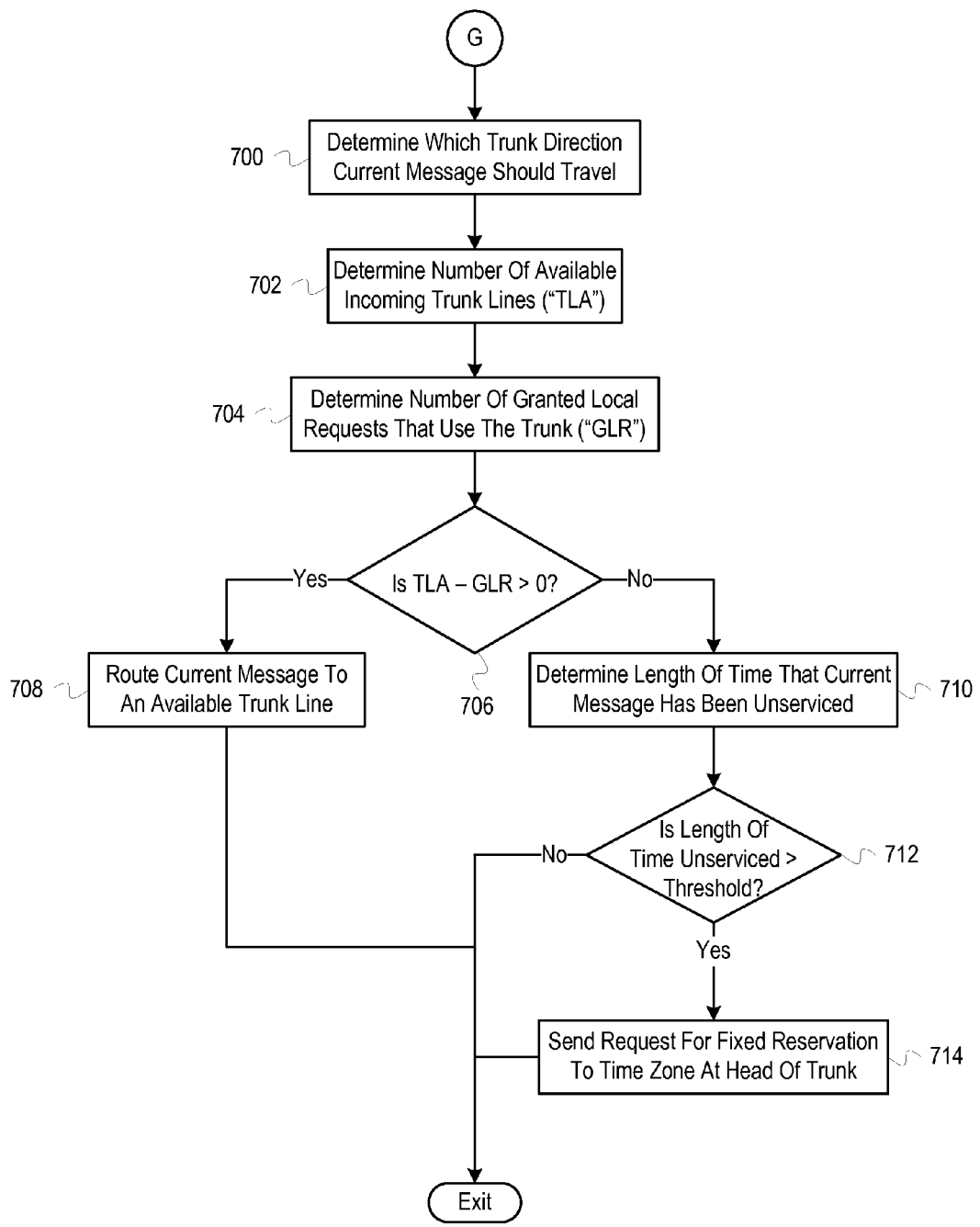
FIG. 7 depicts a flowchart of example operations for determining whether sufficient trunk bandwidth is available to send a message over the trunk.

FIG. 7 depicts a flowchart of example operations for determining whether sufficient trunk bandwidth is available to send a message over the trunk. The operations depicted in FIG. 7 are illustrated as a subroutine used by other processes. However, the operations depicted in FIG. 7 can be implemented as an independent process as well. When the subroutine exits, control flows back to the calling routine At block 700, the direction in which the current message should travel along the trunk is determined. The direction that the current message should travel along the trunk is the direction that gets the current message nearer to the destination of the message. To determine the direction in which the message should travel, the destination time zone identifier can be compared with the current time zone identifier, by querying a routing table, etc. For example, if the time zones are identified by sequential values, all time zones with identifiers less than the current time zone identifier are located in one direction and all time zones with identifiers greater than the current time zone identifier are located in the other direction. The destination time zone for messages that have destinations located in other processors is the time zone that is coupled with the appropriate external link. If a time zone is a terminal time zone, all messages that are sent over the trunk travel in one direction. After the direction that the current message should travel along the trunk has been determined, control then flows to block 702.

At block 702, the number of available incoming trunk channels in the direction that the current message is to be sent is determined. Available incoming trunk channels are trunk channels that do not have a message on them destined for another time zone and do not have a fixed reservation associated with another time zone. If a message arrives on a trunk channel but is destined for a component within the current time zone, the corresponding outgoing trunk channel is available. Thus, only trunk channels that include messages that are passing through the current time zone are unavailable. Trunk channels that do not have a message on them may be associated with a fixed reservation. Fixed reservations are associated with requests from specific time zones, which can be indicated by metadata that arrives with, or before, the fixed reservation. If a trunk channel has a fixed reservation associated with a different time zone, the fixed reservation flows through as if it were a message, thus making that trunk channel unavailable. However, if the fixed reservation is associated with the current time zone, the trunk channel is available. After the number of available incoming trunk channels in the direction that the current message is to be sent is determined, control then flows to block 704.

At block 704, the number of granted local requests that will travel in the same trunk direction as the current message is determined. The number of granted local requests that use the trunk is the number of granted local requests that are not destined for a component within the current time zone. The number of granted local requests that use the trunk can be tracked by a counter that is incremented each time a local request that uses the trunk is granted. A separate counter for each trunk direction can be maintained, and each counter incremented as appropriate. Thus, the number of granted local requests that will travel in the same trunk direction as the current message can be determined by reading the appropriate counter. After the number of granted local requests that will travel in the same trunk direct as the current message is determined, control then flows to block 706.

At block 706, it is determined whether the number of available incoming trunk channels minus the granted local requests for the appropriate trunk direction is greater than zero. The number of available incoming trunk channels minus the granted local requests is the number of available trunk channels. If the number is greater than zero, at least one trunk channel is available on which the current message can be sent. If the number is zero, no trunk channels are available on which the current message can be sent. If it is determined that there are available trunk channels in the appropriate direction, control then flows to block 708. If it is determined that there are no available trunk channels in the appropriate direction, control then flows to block 710.

At block 708, the current message is routed to an available trunk channel in the appropriate direction. The output from the component that is sending the current message can be coupled to the available trunk channel using one or more multiplexers. To route the current message to the available trunk channel, inputs to the one or more multiplexers are selected such that the current message flows from the component output to the available trunk channel via the multiplexers. After the current message is routed to the available trunk channel, the subroutine ends.

Control flowed to block 710 if it was determined, at block 706, that there are no available trunk channels in the appropriate direction. At block 706, the length of time that the current message has been unserviced is determined. The length of time that the current message has been unserviced can be tracked using a counter associated with the requesting component. During each arbitration period in which the current message is not serviced, the counter is incremented. Thus, to determine the length of time that the current message has been unserviced, the value in the counter can be read. After the length of time that the current message has been unserviced is determined, control then flows to block 712.

At block 712, it is determined whether the length of time the current message has been unserviced is greater than a threshold. The threshold can be a preconfigured value or determined dynamically. For example, the threshold might decrease as the number of requests within an individual time zone increases. The threshold can be stored in a register or other storage location. If it is determined that the length of time the current message has been unserviced is greater than the threshold, control then flows to block 714. If it is determined that the length of time the current message has been unserviced is not greater than the threshold, the subroutine ends.

At block 714, a request for a fixed reservation is sent to the time zone at the head of the trunk associated with the direction determined at block 700. The head of the trunk is the end of the trunk from which traffic flows. In other words, the head of the trunk is located along the trunk in the direction opposite of the traffic flow. The request is sent over a dedicated data path from current time zone to the time zone at the head of the trunk. The request at least identifies the requesting time zone. After the request for the fixed reservation is sent to the time zone at the head of the trunk, the subroutine exits.

Figure 8:
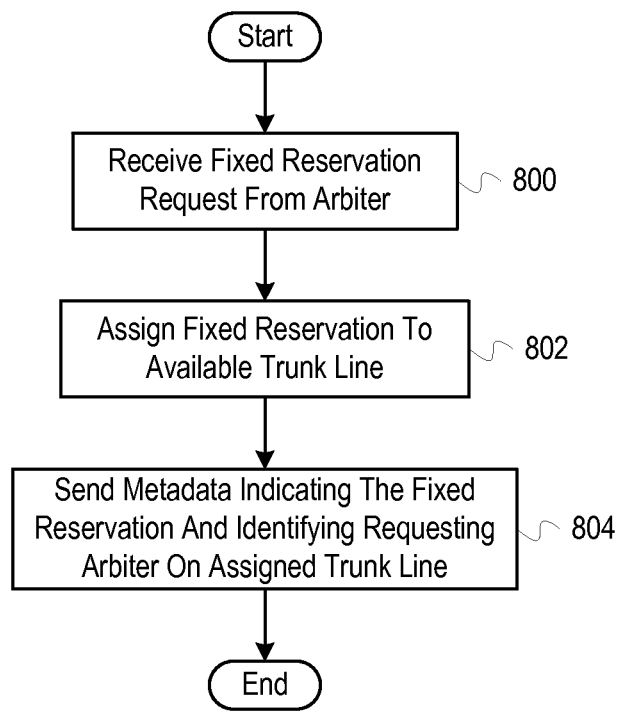
FIG. 8 depicts a flowchart of example operations for handling a request for a fixed reservation.

FIG. 8 depicts a flowchart of example operations for handling a request for a fixed reservation.

At block 800, a request for a fixed reservation is received from an arbiter. The request can be received over a communication channel dedicated to fixed reservations. There can be a single communication channel used by all arbiters or an individual communication channel. If there is a single communication channel, the request includes an identifier that identifies the requesting arbiter. If there are individual communications channels, the request may consist of a Boolean value that indicates that the arbiter associated with the respective communication channel is requesting a fixed reservation. Each individual communication channel can be associated with an identifier that identifies the requesting arbiter. After the request for the fixed reservation is received from the arbiter, control then flows to block 802.

At block 802, the fixed reservation is assigned to an available trunk channel. In some implementations, the fixed reservation receives priority over other traffic directed to the trunk. Thus, the fixed reservation is always assigned to a trunk channel. In some implementations, multiple fixed reservation requests can be received at the same time (e.g., during the same clock cycle). It might also be possible, depending on the number of arbiters and number of trunk channels, to receive more fixed reservation requests than there are trunk channels. Further, if many fixed reservation requests are received over a series of clock cycles, an arbiter at the head of the trunk might not be able to send messages along the trunk (i.e., become "starved"). Thus, in some implementations, the fixed reservation requests that are serviced during a single clock cycle might be limited. For example, each fixed reservation request can be inserted into a queue, and only a certain number can be serviced during a single clock cycle. The number of fixed reservation requests that are serviced during a single clock cycle can be static, such as configurable value that is loaded during a boot process. The number of fixed reservation requests that are serviced during a single clock cycle can vary dynamically as well. For example, if the fixed reservation requests received are starving the arbiter at the head of the trunk, fewer fixed reservation requests might be serviced during a particular clock cycle than if the arbiter at the head of the trunk is not starved. Thus, the available trunk channels for assignment to fixed reservations might be a subset of all of the trunk channels. As such, the assignment of fixed reservations to trunk channels can vary between implementations. After the fixed reservation is assigned to an available trunk channel, control then flows to block 804.

At block 804, metadata indicating that the trunk channel is assigned a fixed reservation and identifying the requesting arbiter is sent on the assigned trunk channel (or an associated channel for sending metadata). As described above, each trunk channel can have an associated channel that carries metadata associated with messages sent along the trunk channel. The metadata associated with the fixed reservation can be sent along the associated channel that carries the metadata. This allows the metadata to arrive prior to the fixed reservation bubble, thus allowing arbiters to factor the fixed reservation into arbitration decisions prior to receiving the actual fixed reservation bubble.

The indication that the trunk channel is assigned a fixed reservation can be a single bit value. For example, the metadata might be stored in intermediate latches along the trunk, as described above. One specified bit of the latches might be used to indicate that the fixed reservation is assigned to the associated trunk channel. An arbiter can thus determine the value of the particular bit to determine that the trunk channel is assigned the fixed reservation. Similarly, another set of bits of the latches can be assigned to identify the time zone associated with the fixed reservation. Thus, the arbiter can determine the requesting arbiter by reading the set of bits assigned to identify the requesting time zone. After the metadata is sent on the assigned trunk channel, the process ends.

As example flowcharts, the flowcharts discussed herein present operations in an example order from which embodiments can deviate (e.g., operations can be performed in a different order than illustrated and/or in parallel). For example, an arbiter implementation might only implement a subset of the depicted operations relevant to the particular arbiter. Consider an arbiter that is not coupled to an external link. The arbiter will not perform any of the operations that an arbiter would if coupled to an external link. Thus the arbiter might not include any software, firmware, or hardware to perform operations that an arbiter coupled to an external link would (such as the operations depicted in FIG. 5). As another example, the operations in the flowchart are arranged such that operations for handling messages arriving from a trunk are performed prior to operations for handling messages from external links. However, the operations for handling messages from external links can be handled before operations for handling messages in some implementations. Additionally, some operations may be delayed until certain thresholds are met. For example, reserved tokens may not be used (as depicted in FIG. 5) until circulating tokens are unavailable for a certain number of clock cycles, similar to the operations depicted in blocks 710 and 712.

The descriptions herein refer to actions taking place in a clock cycle. The use of "clock cycle" is merely representative of a particular time period in which the operations described above can occur. For example, where actions or operations are described as occurring during a clock cycle, some implementations might have the actions or operations occurring during multiple clock cycles or some other measure of duration. Similarly, latches are merely examples of possible storage mechanisms. For example, flip-flops, registers, etc. can be used to store values.

Communications between processors and non-processor components are also possible. Non-processor components can include hardware similar to processors or otherwise implement functionality that allows the non-processor component to interact with processors. As such, the functionality described herein for inter-processor communications can be adapted to non-processor components as well. Further, processors can utilize the same techniques for communications to non-processor components as those described for communicating to other processors.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
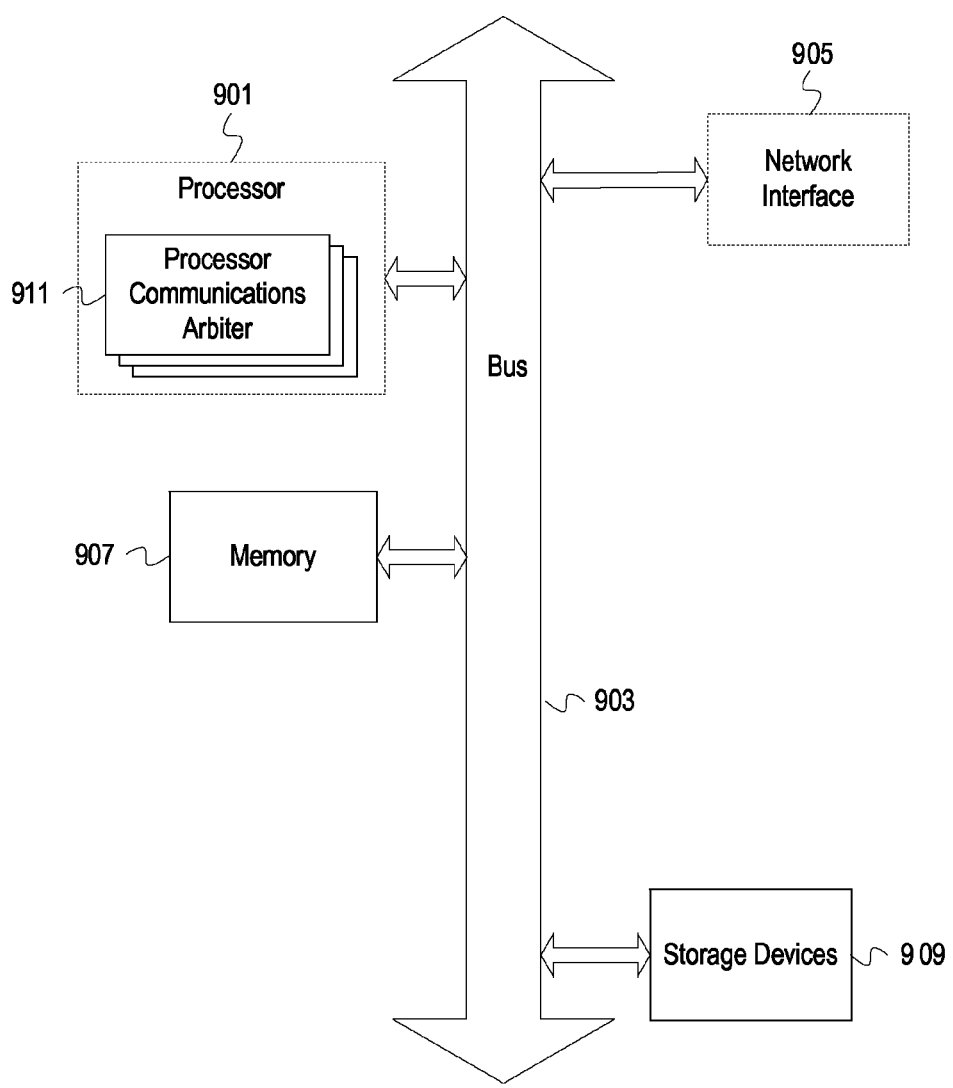
FIG. 9 depicts an example computer system including one or more processor communications arbiters.

FIG. 9 depicts an example computer system including one or more processor communications arbiters. A computer system includes a processor 901 (possibly including multiple processors, multiple cores, multiple nodes, and/or implementing multi-threading, etc.). The processor includes one or more processor communications arbiters 911. The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport®, Infini-Band®, NuBus, etc.), a network interface 905 (e.g., an ATM interface, an Ethernet interface, a Frame Relay interface, SONET interface, wireless interface, etc.), and a storage device(s) 909 (e.g., optical storage, magnetic storage, etc.). The one or more processor communications arbiters 911 receive requests for intra-processor and inter-processor communications and arbitrates the requests, controlling access to resources of a communications infrastructure. The one or more processor communications arbiters 911 may determine which requests are granted, determine bandwidth available on a trunk, and/or obtain tokens for external links. The functionality of the one or more processor communications arbiters 911 can be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901, the storage device(s) 909, and the network interface 905 are coupled to the bus 903. Although illustrated as being coupled to the bus 903, the memory 907 may be coupled to the processor 901.

While the embodiments are described with reference to various implementations and exploitations, it will be understood that these embodiments are illustrative and that the scope of the inventive subject matter is not limited to them. In general, techniques for data communication between computing system components as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

As used herein, the term "or" is inclusive unless otherwise explicitly noted. Thus, the phrase "at least one of A, B, or C" is satisfied by any element from the set {A, B, C} or any combination thereof.

What is claimed is:

1. A method comprising:
  receiving, at an arbiter, a request to send a first message from a first component of a first plurality of components to a second component of a second plurality of components,
    wherein the first plurality of components is in a first time zone, wherein the first time zone represents a first area of a processor in which processor signals can traverse within a specified amount of time,
    wherein the second plurality of components is in a second time zone, wherein the second time zone represents a second area of the processor in which processor signals can traverse within the specified amount of time, wherein a processor signal from the first component of the first plurality of components to the second component of the second plurality of components is not received within the specified amount of time;
  determining, by the arbiter, that the second component is located in the second time zone;
  in response to determining that the second component is located in the second time zone, determining that the second time zone can be communicated with via one or more communications channels in a first direction;
  in response to determining that the second time zone can be communicated with via the one or more communications channels in the first direction, determining whether bandwidth is available on the one or more communications channels in the first direction;
  in response to determining that bandwidth is available on the one or more communications channels in the first direction,
    creating a first data path between the first component and the one or more communications channels in the first direction; and
    granting the request to send the first message to the second component; and
  in response to determining that bandwidth is not available on the one or more communications channels in the first direction, delaying a grant of the request to send the first message to the second component.

2. The method of claim 1, wherein said determining whether bandwidth is available on the one or more communications channels in the first direction comprises:
  determining a count m of requests to send messages granted by the arbiter during a current time period, wherein the messages granted by the arbiter are to be sent using the one or more communications channels in the first direction,
  wherein the one or more communications channels in the first direction comprise a total number n of communications channels,
  wherein bandwidth is available on the one or more communications channels in the first direction if m is less than n.

3. The method of claim 2, wherein said determining whether bandwidth is available on the one or more communications channels in the first direction further comprises:
  determining a count l of messages incoming to the first time zone on the one or more communications channels in the first direction that are not destined for the first time zone,
  wherein bandwidth is available on the one or more communications channels in the first direction if a sum of m plus l is less than n.

4. The method of claim 1 further comprising:
  receiving, at the arbiter via an incoming portion of the one or more communications channels in the first direction, metadata associated with a second message, wherein the metadata indicates a destination of the second message;
  determining whether the destination of the second message is located in the first time zone based, at least in part, on the metadata;
  in response to determining that the destination of the second message is located in the first time zone, determining that the destination of the second message is a third component of the first plurality of components based, at least in part, on the metadata;
  in response to determining that the destination of the second message is the third component, creating a second data path between the one or more communications channels in the first direction and the first component; and
  in response to determining that the destination of the second message is not located in the first time zone, creating a third data path between the incoming portion of the one or more communications channels in the first direction and an outgoing portion of the one or more communications channels in the first direction.

5. The method of claim 4, wherein the second message is received one or more time periods after the metadata.

6. The method of claim 1 further comprising:
receiving, at the arbiter, a request to send a second message from the first component of the first plurality of components to a third component of the first plurality of components;
determining, by the arbiter, that the third component is located in the first time zone;
in response to determining that the third component is located in the first time zone, determining that a count of messages that the third component will receive during a time period in which the third component will receive the second message is less than a maximum number of messages the third component can receive during the time period; and
in response to determining that the count of messages that the third component will receive during the time period in which the third component will receive the second message is less than the maximum number of messages the third component can receive during the time period, creating a second data path between the first component and the third component; and
granting the request to send the second message via the second data path.

7. The method of claim 1, wherein said creating the first data path between the first component and the one or more communications channels in the first direction comprises selecting an input of a plurality of inputs of a multiplexor.

\* \* \* \* \*